(12) United States Patent
Cropper et al.

(10) Patent No.: US 8,782,158 B2
(45) Date of Patent: Jul. 15, 2014

(54) SYSTEM FOR SHARING AND TRACKING REVIEW OF RICH CONTENT, AND METHODS ASSOCIATED THEREWITH

(71) Applicants: Tanner Cropper, Talent, OR (US); Russell Bevers, Fort Collins, CO (US)

(72) Inventors: Tanner Cropper, Talent, OR (US); Russell Bevers, Fort Collins, CO (US)

( * ) Notice: Subject to any disclaimer, the term of this patent is extended or adjusted under 35 U.S.C. 154(b) by 0 days.

(21) Appl. No.: 14/069,038

(22) Filed: Oct. 31, 2013

(65) Prior Publication Data

US 2014/0095637 A1 Apr. 3, 2014

Related U.S. Application Data

(63) Continuation of application No. PCT/US2013/063148, filed on Oct. 2, 2013.

(60) Provisional application No. 61/708,829, filed on Oct. 2, 2012, provisional application No. 61/843,657, filed on Jul. 8, 2013.

(51) Int. Cl.
*G06F 15/16* (2006.01)

(52) U.S. Cl.
USPC .......................................... 709/206; 709/218

(58) Field of Classification Search
CPC ... G06Q 10/10; H04L 29/06; H04L 29/08072
See application file for complete search history.

(56) References Cited

U.S. PATENT DOCUMENTS

| | | | |
|---|---|---|---|
| 6,564,380 B1 * | 5/2003 | Murphy ........................... | 725/86 |
| 2008/0222531 A1 * | 9/2008 | Davidson et al. ............. | 715/736 |
| 2009/0228572 A1 * | 9/2009 | Wall et al. ..................... | 709/218 |
| 2010/0094703 A1 | 4/2010 | Bramley et al. | |
| 2010/0145794 A1 | 6/2010 | Barger et al. | |
| 2012/0159539 A1 * | 6/2012 | Berberet et al. ................ | 725/34 |
| 2012/0179742 A1 | 7/2012 | Acharya et al. | |
| 2013/0330055 A1 * | 12/2013 | Zimmermann et al. ...... | 386/240 |

FOREIGN PATENT DOCUMENTS

SG    WO/2012/115593    *    8/2012

OTHER PUBLICATIONS

Federal Service for Intellectual Property, Patents and Trademarks (Russian Federation), "International Search Report and Written Opinion," mailed Jan. 30, 2014, in related PCT application No. PCT/US2013/063148.

* cited by examiner

*Primary Examiner* — Peling Shaw
(74) *Attorney, Agent, or Firm* — Durham Jones & Pinegar Intellectual Property Group

(57) ABSTRACT

Methods and systems are used to share data as authorized by a provider for review by a recipient. As the recipient reviews information, information relating to the amount reviewed is tracked, and the provider is notified of whether or not the recipient has accessed the shared information and/or the extent to which the shared information was reviewed. The shared information may, in some contexts, be video data. Video may be captured and automatically uploaded to a network-accessible location. The uploaded video may then be shared with a recipient. As the recipient reviews the uploaded video, the amount viewed by the recipient can be tracked, and the provider notified of the amount viewed.

17 Claims, 11 Drawing Sheets

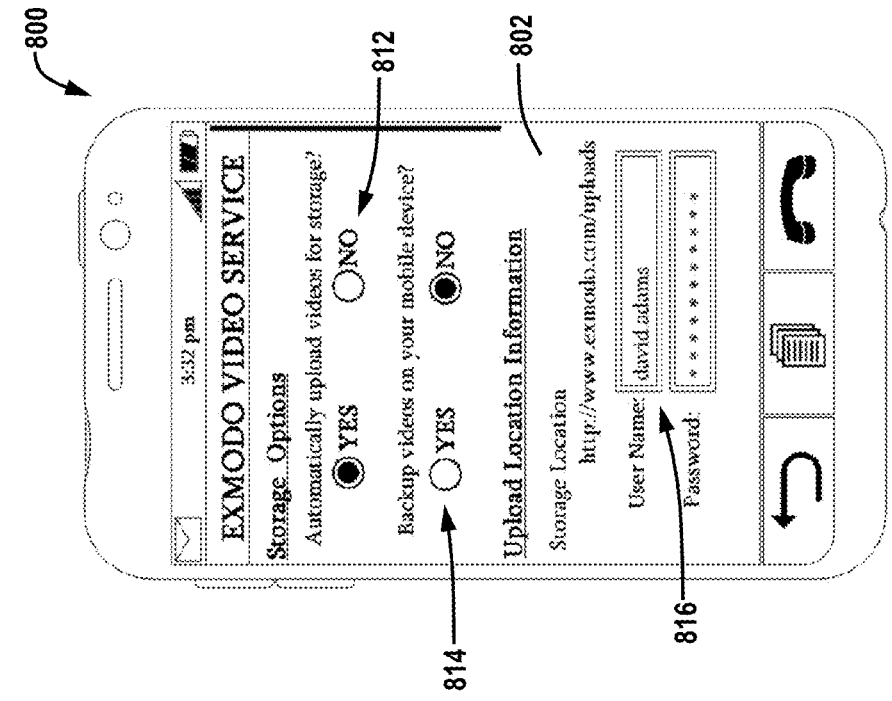
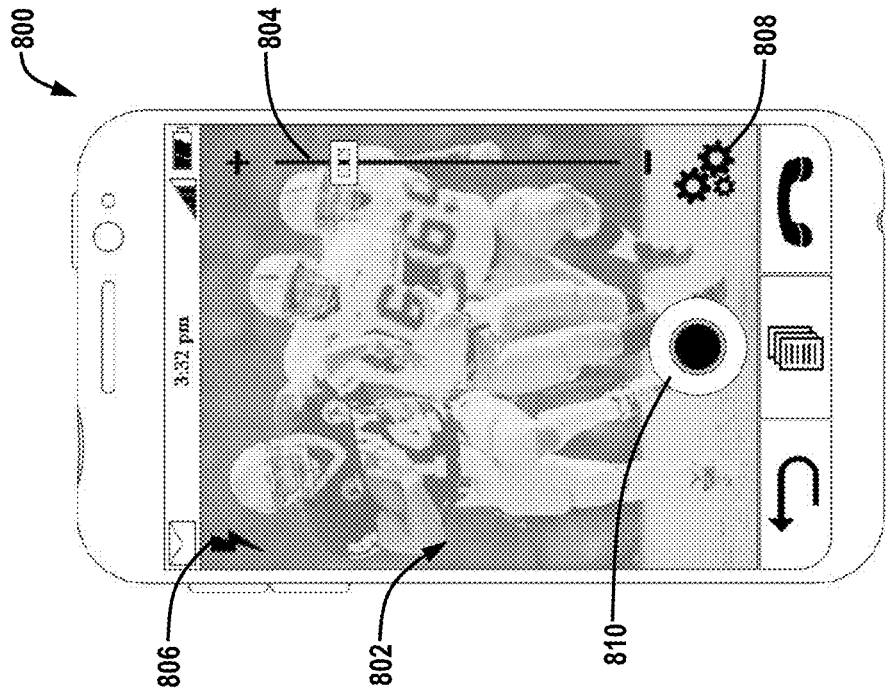
Fig. 8B
Fig. 8A

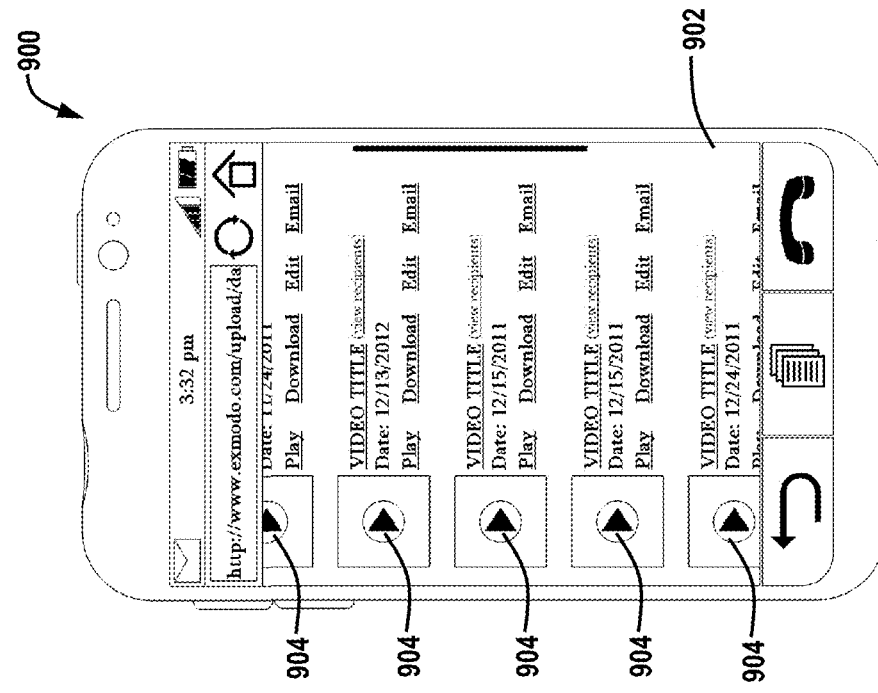
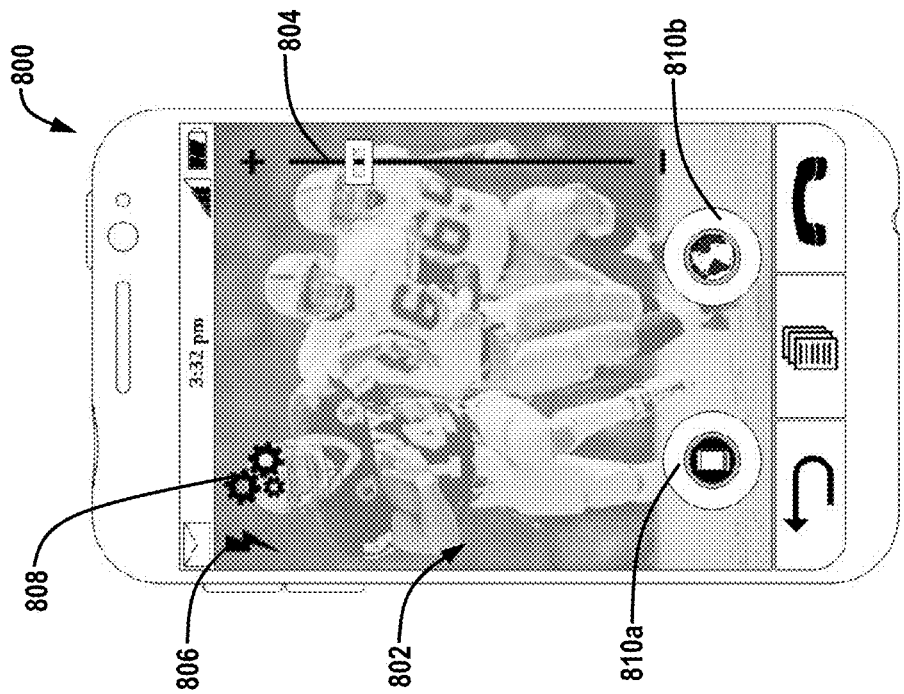
Fig. 9
Fig. 8C

SYSTEM FOR SHARING AND TRACKING REVIEW OF RICH CONTENT, AND METHODS ASSOCIATED THEREWITH

CROSS-REFERENCE TO RELATED APPLICATIONS

This application is a continuation of international patent application no. PCT/US13/63148, which was filed pursuant to the Patent Cooperation Treaty on Oct. 2, 2013 ("the '148 PCT Application"). The '148 PCT Application claims the benefit of the filing dates of U.S. Provisional Patent Application No. 61/708,829, filed on Oct. 2, 2012, and U.S. Provisional Patent Application No. 61/843,657, filed on Jul. 8, 2013. The entire disclosures of all of the foregoing applications are hereby incorporated herein.

TECHNICAL FIELD

The present disclosure relates to communication systems and platforms. More particularly, embodiments of the present disclosure relate to systems, devices, software and methods for sharing media using a communication system. More particularly still, some aspects of the present disclosure include sharing video, still images, audio, presentations or other media or rich content. The disclosure also relates to systems, devices, software and methods that enable a provider of rich content to track a recipient's evaluation of such rich content. Additional aspects of the present disclosure relate to systems, methods and software for uploading rich content substantially in real-time with the capture or preparation of such rich content.

BACKGROUND

Email has commonly been used to send messages between different people, or even between different groups of people. In practice, email allows a user to send a message text and potentially include other items as attachments. Not surprisingly, text is often a poor mechanism for communication. While text itself can convey valuable information, text does not often provide sufficient information on a person's tone. Sarcasm, humor, and other items that may readily be apparent when listening to a person are often lost in text, or if included in text must by explicitly added in text, thereby increasing the length of a message and the time needed to read and understand the message.

Email and other similar communication may also not result in a person understanding the received message. In particular, many people are more likely to retain information that is conveyed to them audibly or visually. As a result, a person may read pages of text but may retain little of the information. Moreover, the person sending the message often does not know if the message was read, let alone whether it was understood. For example, email systems now allow a user to send a message that includes a so-called "read receipt." Upon opening the email, the read receipt may send a message back to the sender indicating that the message was opened. The read receipt does not, however, give the user an idea as to whether or not the recipient read the full message. The sender may therefore be left wondering whether or not the recipient read or understood the message, and often may follow up with a phone call or subsequent email to see if the message was understood. As a result, time may be wasted just to see if information was accurately interpreted or even received.

SUMMARY

In accordance with aspects of the present disclosure, embodiments of methods, systems, software, computer program products, and the like are described or would be understood, and which relate to communicating data and tracking the review of the data, which is also referred to herein as information, content and/or data, by a recipient. Communicated data may include data that is provided by a provider, or sender, and sent to a recipient who may read, view, listen or otherwise access the information. As the recipient accesses the information, the progress of the recipient's access to the information may be tracked. Information about that tracking may be accessed by the provider, thereby allowing the provider to see what information the recipient looked at, and/or what extent of progress the recipient has made in viewing or otherwise accessing the information. The provider may in some cases instantaneously view information to know whether or not the recipient has viewed received information, making a follow-up communication unnecessary.

In accordance with one embodiment of the present disclosure, methods and systems may be provided for using video, audio, multimedia, or other types of media that may be more likely to be understood by a recipient. In one embodiment, a device may use a camera to record a video. The video may be attached to, or linked in, an email message sent to a recipient. Upon receiving the email message, the recipient may see a picture to identify the sender of the video. If then wanting to hear from the person, the recipient can access the video and view the message. Because information is conveyed visually and/or audibly, some people may be more likely to not only retain the information, but may also be more likely to correctly understand the information.

The provider may also benefit from sending of messages in a rich format. When the content is prepared, it may be uploaded or stored by a hosting service. The hosting service may track when the data is accessed, and for how long it is accessed. As a result, if the recipient decides not to review the video, the provider can access reporting information indicating that the video was not played. If the recipient does view the information, the provider can access reporting information indicating that the video was played, when it was played, how much was played, or the like. The provider may thus know whether or not the information was accessed by the recipient.

Some embodiments of the present disclosure also contemplate automating provision of content produced by a provider for sending to a recipient. For instance, when a video or other content is created, the content can be automatically uploaded to a hosting service. In one aspect, a video may be initiated and the capturing device may open a connection with the hosting service and start uploading the captured data in real-time. Thus, when it is time to send the information to a recipient, there may be little or no delay in attaching a video, uploading the video, or the like.

Other aspects, as well as features and advantages of various aspects, of the present disclosure will become apparent to those of ordinary skill in the art through consideration of the ensuing description, the accompanying drawings and the appended claims.

BRIEF DESCRIPTION OF THE DRAWINGS

In order to describe the manner in which features and other aspects of the disclosed subject matter can be obtained, a more particular description of certain subject matter will be rendered by reference to specific embodiments which are illustrated in the appended drawings. Understanding that these drawings depict only typical embodiments and are not therefore to be considered to be limiting in scope, nor drawn to scale for all embodiments, various embodiments will be described and explained with additional specificity and detail through the use of the accompanying drawings in which:

FIG. 8A illustrates an embodiment of a mobile device capable of capturing image data, and an interface for commencing capture of the image data and uploading of the image data about simultaneous with the capture of the image data;

FIG. 8B illustrates an embodiment of a mobile device with an interface for defining settings related to capture and upload of image data;

FIG. 8C illustrates another embodiment of a mobile device capable of capturing image data, the device displaying an interface having multiple capture options to enable captured data to be stored locally or uploaded to a network accessible location;

FIG. 9 illustrates an embodiment of an interface on a mobile device, the interface providing access to one or more image files uploaded to a network location from a mobile device;

DETAILED DESCRIPTION

Systems, devices, software, methods and computer program products according to the present disclosure may be configured for use in sharing text, audio data, video data, image data, or other information that can be used to provide a recipient with information on one or more topics. Optionally, tracking and reporting may also occur to enable a provider of the information to know whether or not (and potentially to what extent) the recipient of the information reviewed the shared information. Without limiting the scope of the present disclosure, data that is shared may include any number of different types of data in any format that may be used to convey information. For instance, the shared information may include rich content such as video or image information which can be watched or viewed by the recipient of the information. Additionally, or alternatively, shared information may include audio information which can be listened to by the recipient. Still other types of data that may be shared include multi-media presentations, text information, or other types of information that can be created or shared by one entity and perceived by another.

Figure 1:
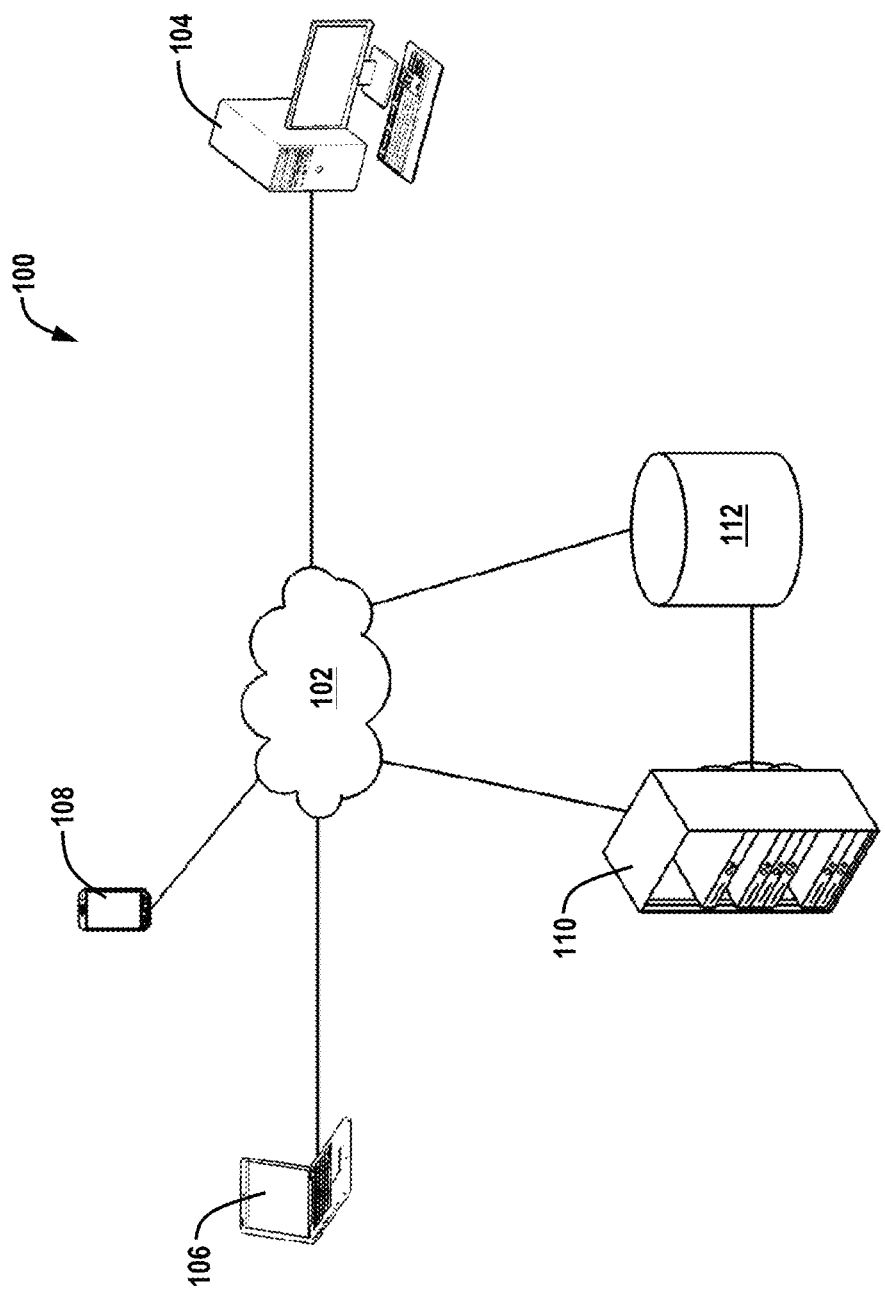
FIG. 1 is a schematic illustration of an embodiment of a communication system that may be used in connection with communicating educational data from a provider to a recipient and reporting back to the provider about the recipient's access to the information.

Turning now to FIG. 1, an embodiment of a system 100 is shown that comprises a distributed system 100 usable for communicating educational information and/or reporting on the review of such information. The system of FIG. 1 is intended to illustrate an embodiment of a system; it is not intended to limit the disclosure to any specific structure or arrangement. Rather, any alternate system capable of being used in whole or in part with the methods, systems, computer-program products, or the like disclosed herein—whether such system now exists or is developed in the future—falls within the scope of the present disclosure.

In the illustrated system 100, the operation of the system 100 may include a network 102 facilitating communication between one or more end user devices 104-108. Such end user devices 104-108 may include any number of different types of devices or components. By way of example, such end user devices 104-108 may include computing or other types of electrical devices. Examples of suitable electrical devices may include cell phones, smart phones, personal digital assistants (PDAs), tablet computing devices, netbooks, e-readers, laptop computers, desktop computers, media players, global positioning system (GPS) devices, other devices capable of communicating data over the network 102, or any combination of the foregoing. Accordingly, while FIG. 1 illustrates end user devices 104-108 as including a desktop computer 104, a laptop computer 106 and/or a mobile device 108 (e.g., a so-called "smart phone", etc.), such devices are merely illustrative. Indeed, other types of end user devices may be used in the system 100, and the system 100 may also include multiple end user devices of the same type. For instance, other or additional end user devices may include tablet computing devices, cameras, e-readers, or other electronic devices.

In some embodiments, communication may be provided between the end user devices 104-108, and such communication may occur using or in connection with additional systems, devices or components. Examples of additional systems, devices or components that optionally facilitate communication between end user devices 104-108 may include, but are not limited to, servers 110 and/or data stores 112. Moreover, while the network 102 may communicate with such devices directly, in other embodiments communication may occur using multiple different devices or systems. In some embodiments, authentication systems (e.g., hardware and/or software, etc.) may be provided to require device authentication, message authentication, and the like.

In at least one embodiment, the network 102 may be capable of conveying or transmitting electronic communications. The Internet, local area networks, wide area networks, virtual private networks (VPN), telephone networks, other communication networks or channels, or any combination of the forgoing may thus be represented by the network 102. Accordingly, the network 102 and devices connected thereto may operate in a number of different manners. Different manners of operation may be based at least in part on a type of the network 102 or a type of connection to the network 102. For instance, various components of the system 100 may include hard-wired communication components and/or wireless communication components or interfaces (e.g., 802.11, Bluetooth, CDMA, LTE, GSM, HSPA+, or other developed or to-be-developed wireless systems, etc.). Moreover, while a single server 110 and a single network 102 are illustrated in FIG. 1, such components may be illustrative of multiple devices or components operating collectively as part of the system 100. Indeed, the network 102 may include multiple networks interconnected, and which can facilitate communication between one or more of the end user devices 104-108. Similarly, the server 110 may represent multiple servers or other computing elements either located together or distributed in a manner that facilitates operation of one or more aspects of the system 100. Further still, while the optional data 112 stores are shown as a single storage device that is separate from the server 110 and the end user devices 104-108, in other embodiments the data stores 112 may be wholly or partially included within any other system, device or component, or may include multiple data stores 112 distributed among different locations and/or components. In some embodiments, the end user devices 104-108 may leverage the server 110 and/or the data stores 112 in a software-as-a-service or cloud-computing environment.

The system 100 may be used to provide information, including audio, video, still image, text, multi-media, or other information or some combination of the foregoing. The end user devices 104-108 may include, for instance, display devices, speakers, or the like so as to enable a user of an end user device 104-108 to receive audio, video, still image, text or other information and view and/or listen to such information.

In accordance with some embodiments of the present disclosure, information generated or received at one component of the system 100 may be provided to another component of the system 100. For instance, one end user may provide information. That information may be stored on an end user device 104-108 and/or at another location and made available through the network 102. The information may be conveyed so as to be accessible at a different end user device 104-108 or to a different user of an end user device. In some embodiments, information that is provided may be stored at the server 110 or data store 112, while in other embodiments the information may additionally or alternatively be stored on an end user device 104-108.

Information shared via the network 102 may be provided in a number of different formats or manners. For instance, shared data may be transferred in its entirety to a particular one of the end user devices 104-108. An example may include sharing information over an FTP site or in an email (e.g., as an attachment, as a link to a network address, etc.) so that the data may be downloaded as a file, folder, or the like. In still another embodiment, however, the information may be provided in portions. One example may include streaming of data so that portions of data are provided at any time. As also discussed herein, streaming of data may allow review of the data to be monitored. For instance, if a user stops streaming data, the server 110 or another component may determine what portion of data was provided and what portion of data was not provided and thus not reviewed by an end user.

The particular manners in which the system 100 may be used will become more apparent in connection with the following disclosure which provides additional details about various embodiments and aspects of the present disclosure. Nevertheless, to provide an understanding of some aspects of the invention, one illustrative, non-limiting example is first provided.

According to one example, a person, or provider, having information that he or she wishes to communicate to another user, or recipient, may create and store the information in a format that can be perceived by another user for the recipient's education or other viewing. One example may include a provider's use of a camera to produce a video with both image and audio data. Such a camera may have any desirable quality or characteristics. In one embodiment, for instance, the camera may be able to record high definition video, although in other embodiments lower resolution video may be recorded.

In another example, a provider may use a microphone to record audio data. In still another example, a text document may be created, or a multimedia presentation (e.g., a POWERPOINT multimedia presentation, etc.) may be created to recite and convey desired information. Whatever the type of information that is created, the provider may create the information using one of the end user devices 104-108 (e.g., a desktop computer 104, etc.). Alternatively, a different device may be used and an end user device 104-108 may instead be used to store the information or otherwise make the information available to one or more recipients via the network 102.

In the example of a video, a provider may create a video using an end user device 104-108 and/or a video camera. The video may be stored in a digital file that can then be sent over the network 102. The video may be provided to the server 110 or data stores 112 for long-term storage. Alternatively, the video may be stored locally on the end user device 104-108 and/or sent to another end user device 104-108. The creator or a provider of the video may, for instance, send the video by email to an intended recipient. That recipient may then access the video from his or her email and watch the video on one of the end user devices 104-108. Alternatively, the provider may send a link to the video (e.g., such as where the video is stored at the server 110 or data stores 112, etc.). In still another embodiment, the user may make the video available through a website or other resource that allows a user to access the resource to retrieve the video.

As the recipient plays the video, moving images may be displayed on a display of the end user device 104-108. Closed captioning may also be displayed and/or audio may be played through a speaker of the end user device 104-108. In some embodiments, the recipient may play the entire video. In other embodiments, the recipient may only play some of the video. In the latter case, the recipient may miss some information that is conveyed. It may be important or useful for the provider to know that some information was not conveyed. To perform such an action, the server 110 may monitor which portion of the video was played. Alternatively, the end user devices 104-108 may include reporting applications that monitor review of the video. The reporting application on the server 110 and/or end user devices 104-108 may transmit information over the network 102 related to what portion of the video was played. If, for instance, the recipient only played half of the video, information may be stored to indicate the percentage played and when it was played. Additional or other information may be stored to indicate the precise portions of the video played (e.g., 0:00:00 through 0:07:18 of a video having a length of 0:14:36, etc.). If different portions of the video are played at different times, information on what portions of the video were played at each time may also be stored. Optionally, the end user of the end user device 104-108 (i.e., the provider) may review the corresponding reporting data to determine if the recipient accessed any of the information and, if so, whether it was accessed in its entirety and/or what portion was accessed.

Figure 2:
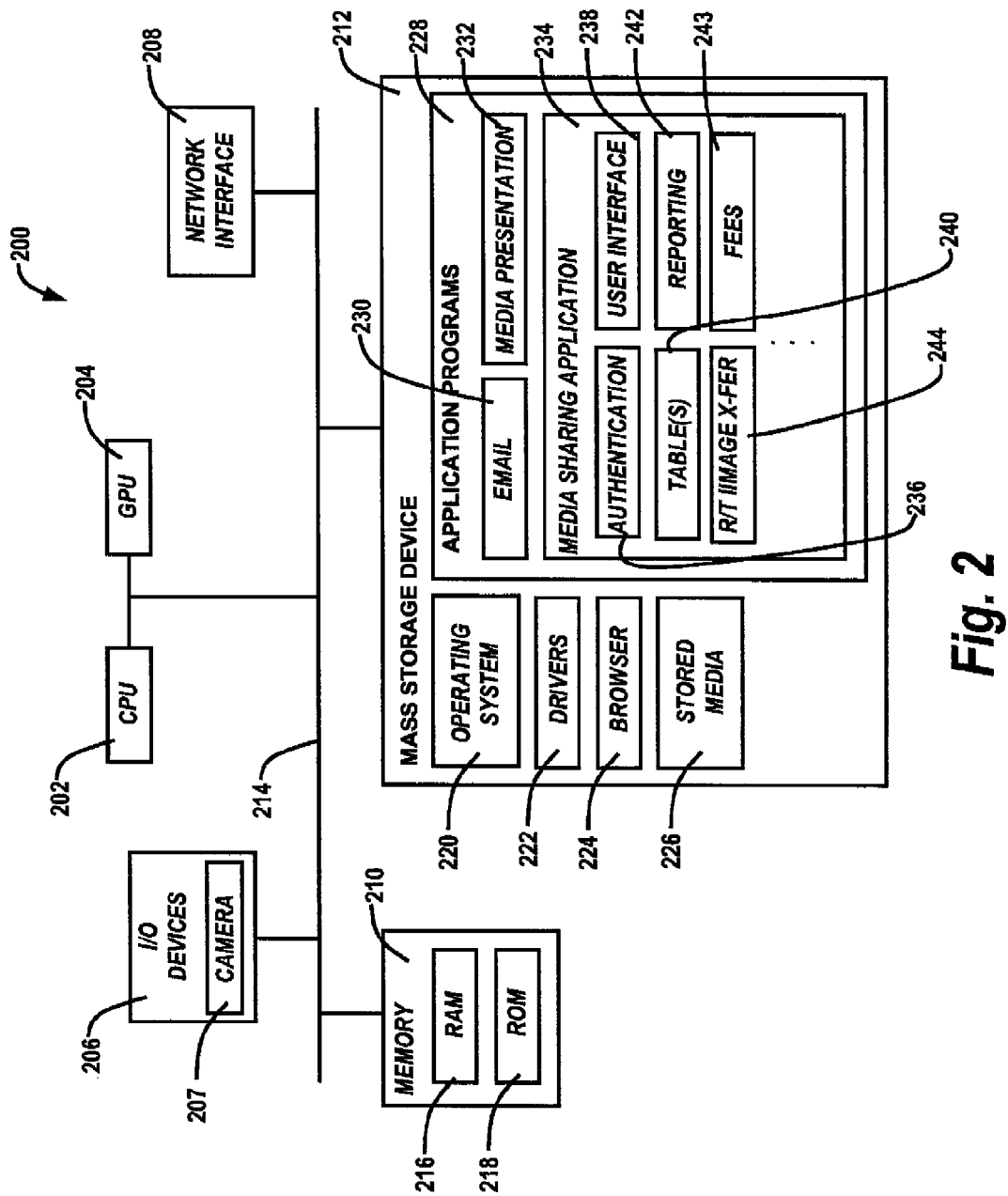
FIG. 2 is a schematic illustration of an embodiment of a computing system that may receive or send information over the communication system of FIG. 1.

Turning now to FIG. 2, an embodiment of a computing system 200 is illustrated and described in additional detail. The computing system 200 may generally represent an example of one or more of the devices or systems that may be used in the system 100 of FIG. 1. To ease the description and an understanding of certain embodiments of the present disclosure, the computing system 200 may at times herein be described as generally representing an end user device such as the end user devices 104-108 of FIG. 1. In other embodiments, however, the computing system 200 may represent all or a portion of the server 110 of FIG. 1, be included as part of the network 102 of FIG. 1, or otherwise used in any suitable system, device or component within the system 100 or another suitable system. FIG. 2 thus schematically illustrates one embodiment of a computing system 200 that may be used as or within an end user device, server, network, or other device or system; however, it should be appreciated that devices or systems may include any number of different or additional features, components or capabilities, and FIG. 2 and the accompanying description should not be considered limiting of the present disclosure. Moreover, the computing system 200 may also be distributed among multiple computing devices.

In FIG. 2, the computing system 200 includes multiple components that may interact together over one or more communication channels. In this embodiment, for instance, the computing system 200 may include multiple processing units. More particularly, the illustrated processing units include a central processing unit (CPU) 202 and a graphics processing unit (GPU) 204. The CPU 202 may generally be a multi-purpose processor for use in carrying out instructions of computer programs of the computing system 200, including basic arithmetical, logical, input/output (I/O) operations, or the like. In contrast, the GPU 204 may be primarily dedicated to processing of visual information. In one example embodiment, the GPU 204 may be dedicated primarily to building images intended to be output to one or more display devices (e.g., video images, etc.). In other embodiments, a single processor or multiple different types of processors may be used other than, or in addition to, those illustrated in FIG. 2.

The CPU 202, GPU 204 or other processor components may interact or communicate with input/output (I/O) devices 206, a network interface 208, memory 210 and/or a mass storage device 212. One manner in which communication may occur is using a communication bus 214, although multiple communication busses or other communication channels or any number of other types of components may be used. The CPU 202 and/or GPU 204 may generally include one or more processing components, capable of executing computer-executable instructions received or stored by the computing system 200. For instance, the CPU 202 or GPU 204 may communicate with the input/output devices 206 using the communication bus 214. The input/output devices 206 may include display devices, cameras (e.g., camera 207, etc.), ports, keyboards, a mouse, scanners, printers, touch screens, microphones or other audio input devices, speakers or other audio output devices, global positioning system (GPS) units, audio mixing devices, sensors, other components, or any combination of the foregoing, at least some of which may provide input for processing by the CPU 202 or GPU 204, or be used to receive information output from the CPU 202 or GPU 204.

Similarly, the network interface 208 may receive communications via a network (e.g., network 102 of FIG. 1, etc.). Received data may be transmitted using the communication bus 214 and processed in whole or in part by the CPU 202 or GPU 204. Alternatively, data processed by the CPU 202 or GPU 204 may be transmitted using the communication bus 214 to the network interface 208 for communication to another system, device or component over a network or other communication channel. Accordingly, if the computing system 200 is used to provide rich content, such as video, to a recipient, the network interface 208 may be used to send the information to a recipient's computing device, email account, or other location. In contrast, if the computing system 200 is used to receive video or other information from a provider, the network interface 208 may be used to receive or retrieve the information. Of course, the computing system 200 may also act as an intermediary through which information or instructions are received using the network interface 208 and, in response, video, audio or other information is provided to a recipient's end user device and/or reported information about the review of the shared information is sent to the provider's end-user device.

The computing system 200 may also include memory 210 and mass storage device 212. In general, the memory 210 may include both persistent and non-persistent storage, and in the illustrated embodiment, the memory 210 is shown as including random access memory (RAM) 216 and read only memory(ROM) 218. Other types of memory or storage may also be included in memory 210. The mass storage device 212 may generally be comprised of persistent storage in a number of different forms. Such forms may include a hard drive, flash-based storage, optical storage devices, magnetic storage devices, or other forms which are either permanently or removably coupled to the computing system 200, or in any combination of the foregoing. In some embodiments, an operating system 220 defining the general operating functions of the computing system 200, and which may be executed by the CPU 202 or GPU 204, may be stored in the mass storage device 212. Other example components stored in the mass storage device 212 may include drivers 222, a browser 224 (e.g., an Internet browser), stored media 226 (e.g., audio, video, multimedia, or other information that is provided or received), or application programs 228.

The term "drivers" is intended to broadly represent any number of programs, code, or other modules including Kernel extensions, extensions, libraries, or sockets. In general, the drivers 222 may be programs or include instructions that allow the computing system 200 to communicate with other components either within or peripheral to the computing system 200. For instance, in an embodiment where the I/O devices 206 include a display device, the drivers 222 may store or access communication instructions indicating a manner in which data may be formatted to allow data to be communicated thereto, so as to be understood and displayed by the display device. The drivers 222 may also store or access sockets or other information allowing real-time or other communication with other components (e.g., a server, a cloud computing device, etc.) over the network interface 208.

The browser 224 may be a program generally capable of interacting with the CPU 202 and/or GPU 204, as well as the network interface 208 to browse programs or applications on the computing system 200 or to access resources available from a remote source. Such a remote source may optionally be available through a network or other communication channel available through the network interface 208. In some cases, a browser 224 may operate by receiving and interpreting pages of information, often with such pages including mark-up and/or scripting language code. In contrast, executable code instructions executed by the CPU 202 or GPU 204 may be in a binary format or other similar format and be executable and understood primarily by the CPU 202, GPU 204 or another processor component.

As will be appreciated by one of ordinary skill in the art in view of the disclosure herein, some aspects of the present disclosure optionally operate through use of the browser 224. For instance, a website may be provided through which videos, still images, audio, presentations or other rich content or information may be uploaded by a provider. The website may send notifications to a recipient and/or make the video or other information available through the browser 224. Thus, the recipient can access the information through the browser 224 without a specific stand-alone application. This may be the case whether the recipient is using a mobile device such as a phone or personal media player, a laptop, a desktop computing device, or some other device, provided the device has a browser. As an example, the browser 224 may be used to access an email account and one or more attachments in an email and/or resources using links in the email. In other embodiments, however, functions or services may be provided through a stand-alone application to the mobile device, laptop, desktop, or other device. A mobile device, for instance, may use a mobile application to capture data, send the data, receive data, or for other purposes, or any combination of the foregoing. Of course, other tools may also be used to access information provided by the provider of the information, as well as combinations of browser-based services, stand-alone applications, and the like.

Application programs 228 may include other programs or applications that may be used in the operation of the computing system 200, and optionally in connection with the sharing and/or reporting of information related to a recipient's review of provided information. Examples of application programs 228 may include an email application 230 capable of sending or receiving email or other messages over the network interface 208. Such an email application 230 may be used to email videos or other information and/or reports related to the review of shared information. Alternatively, an email application 230 could be omitted or provided through a browser-based service.

Still other applications may also be provided. In FIG. 2, for instance, a media presentation program 232 is provided. The media presentation program 232 may include any number of different capabilities. An example media presentation program 232 may enable a user to view videos and/or listen to audio presentations of one or more formats. In another embodiment, the media presentation program 232 may allow a user to view textual information, presentations, spreadsheets or other productivity information, or to create, edit or modify any such media. A provider of information may therefore use the media presentation program 232 to create media of one type (e.g., video, audio, presentation, etc.) that is to be shared, whereas a recipient may use a similar program to access the provided information. In some embodiments, the media presentation program 232 may include camera-based or image-based features, including the ability to capture and/or view videos or other images.

As will be appreciated by one of ordinary skill in the art in view of the disclosure herein, other types of application programs 228 may provide other functions or capabilities, and may include word processing applications, spreadsheet applications, programming applications, computer games, audio or visual data manipulation programs, camera applications, map applications, contact information applications, calendaring applications, or other applications, or some combination of the foregoing.

In at least one embodiment, the application programs 228 may include applications or modules capable of being used by the computing system 200 in connection with sharing information and/or reporting to a provider whether the information was reviewed. For instance, in one example, a medical professional may create a video that provides a patient with information about potential complications or risks of a procedure, proper use of a prescribed drug or treatment, or the like. Such a video may be created using the media presentation program 232 of the computing system 200 and stored with the stored media 226. The medical professional may then use the email application 230 to send the video via the network interface 208 to the recipient. In another embodiment, however, the video or other information may be shared using different or additional applications, including a media sharing application 234. In this embodiment, the media sharing application 234 includes multiple different modules, although such modules may be combined, removed, include still other modules, or any combination of the foregoing.

As shown in FIG. 2, one example module of a media sharing application 234 for sharing media or other rich content may include an authentication module 236. The authentication module 236 may be used to ensure that a person providing and/or receiving shared information is the intended provider or recipient, or a person authorized by the authorized provider or recipient. For instance, the authentication module 236 may embed authentication or authorization information in a shared media file, so a user must enter a known password or other credentials to view the video. As an example, the shared media, or a notification to the user of the availability of the shared media, may include an optional secret key. Such key can prevent third parties from being able to easily view the information provided by the media provider. In another embodiment, such as where the computing system 200 is used in connection with a server or website, the authentication module 236 may require a user login to a particular website and enter his or her user credentials. The intended recipient may, for instance, receive an email that a video or other media file is available. The notification can include a link or other information so as to enable the recipient to hear, watch, read or otherwise review the shared information. Such a notification can also be provided by other means, including text message (e.g., SMS, MMS, etc.), app-to-app delivery, or other notification methods. In other embodiments, the authentication module 236 may be eliminated.

Where the authentication module 236 is used by a recipient, the recipient may enter his or her login credentials or otherwise input authentication information, and the authentication module 236 may evaluate the credentials and enable or prevent access if the credentials are accepted or rejected, respectively. Of course, the authentication module 236 may also, or alternatively, request or require credentials from a provider of information so as to enable the provider to access the website or system and upload or share information, or receive reports relating to whether shared information has been viewed. Moreover, combinations of the above may be included, such as where a secret key or password is required to access a notification, as well as some credentials to access shared information. Credentials, passwords, secret keys, etc. for accessing the notification may in such an embodiment be the same or different than credentials, passwords, secret keys, etc. for accessing a website or other data store on which the media is located.

The illustrated media sharing application 234 may also include a user interface module 238. In particular, as a user logs in or otherwise accesses a provided media sharing service, the user interface module 238 may create A view which displays information for the user. If, for instance, the user is a provider of information, the interface may display options for the provider to create or upload information, specify an intended recipient, review reports on past information shared with one or more recipients, and the like. If the user is a recipient of information, the user interface module 238 may generate a view that provides the recipient with access to shared information, plays or otherwise displays the information when it is selected, displays information about the shared information (e.g., who shared it, when, what it relates to, how much has been viewed, etc.).

The media sharing application 234 may optionally include one or more sets of tables 240. The tables 240 may be used for any of a number of different purposes. For instance, one table 240 may be associated with a particular provider of information to indicate which videos or other information that provider has created or shared. Such a table 240 may include information about with whom the information was shared. The same or another table 240 may then also include information about which recipient(s) reviewed the shared information. Such information may be stored in a number of different granularities. By way of illustration, data of the tables 240 may simply indicate whether or not a user viewed information in its entirety. Data in the tables 240 may additionally or alternatively store information about what portions of information were reviewed or not reviewed. In such an embodiment, if the user later accesses an unfinished video or other type of shared information, the table 240 can be referenced to automatically start where the recipient left off. Similarly, the tables 240 may also provide information to be reported to the provider of the information. A provider who is a medical provider according to the example above may, for instance, want to see if a particular patient reviewed pre-operation instructions, treatment instructions, or the like. A reporting module 242 may also use the tables 240 to provide the desired information to the information provider.

The reporting module 242 can receive, use and provide information in a number of different ways. As noted previously, the reporting module 242 may track whether a recipient reviews information (e.g., by listening, watching, reading, clicking-through, or otherwise viewing the information, etc.). Upon request from the provider, the extent to which the information has been reviewed may be provided to an interface used by the provider, or sent via email, text message, etc. In some embodiments, the reporting module 242 may provide such information in an automated manner As an example, the reporting module 242 may periodically monitor whether or not a recipient has reviewed information. If the material has not been reviewed after a specified period of time, the system may notify the provider, re-send the information, send a reminder, or some combination thereof. The period of time may be variable, and can even be set by the provider. Additionally, or alternatively, a percentage of completion may be set programmatically or customized by the user so that if the amount reviewed does not exceed the required completion percentage, the provider may be notified, a reminder may be sent, the information may be re-sent, other actions may take place, or some combination of the foregoing. Of course, the automated system may also, rather than automatically resending information or sending a reminder, automatically notify the provider that the information may need to be resent, that the provider may want to verify contact information, and the like, so as to ensure that the communication between the provider and recipient is effective.

The reporting module 242 may also operate in real-time. For instance, a video or other type of media may be sent via email (e.g., as a link to the media). The media may be streamed to enable real-time tracking of the portion accessed. As access occurs, that information can be reflected in the tables 240. A provider using the media sharing application 234 may also be given real-time, or near real-time, access to the data stored in the tables 240 by using the reporting module 242. A provider may, therefore, not need to wait for a notification or report, but may access reporting information on his or her own initiative.

An embodiment of a media sharing application 234 may additionally or alternatively include a fees module 243. The fees module 243 may be used in some embodiments in which third party media is accessed and/or provided to one or more recipients. For instance, a specialist or other person who selects educational media for a recipient may access third party content. The fees module 243 may track use of the third party content and bill, charge or otherwise associate fees, royalties, or the like with such information. A fees module 243 may also perform other or additional functions.

As one example, the fees module 243 may be used to provide compensation or credits based on the review or use of information provided by third parties. For instance, a provider may review information created by one or more third parties. By accessing the third party information, the provider may receive monetary or other compensation as tracked by the fees module 243. In one embodiment, the compensation is in the form of a credit towards fees for using an educational or media sharing platform as described herein. Such compensation may be in the form of advertising revenue tied to an amount of content reviewed, the precise content reviewed, or some combination thereof. Fees may then also be charged or credited based on any content ultimately selected and shared with one or more recipients. Third parties may charge for use of particular content (e.g., sending of content to another end user, etc.). Charges may be associated with each use. For instance, the number of media uploaded, the file size of uploaded media, the number or file size of shared media, etc. may be used as a basis for charges to use the computing system 200. As one example, a content provider may receive payment or credits based on an amount of third party content played or reviewed. Alternatively, or additionally, third parties may receive payments, credits or other compensation based on the amount of content actually shared with others and/or the amount of the content that has been played or reviewed. Such compensation may optionally be without regard to who made the content available to one or more recipients and/or whether the content was ultimately shared with recipients. The fees module 243 may track any or all such compensation and/or actions resulting in payment. Further, the fees module 243 may manage, determine, invoice, bill or charge fees recipients pay to the service and information provider, fees paid by service providers for using the educational platform, or any other fee of any type.

In other embodiments, fees or charges may occur as part of a subscription-based service. Thus, a subscriber may pay a particular amount per week, per month, per year, etc. to use the service to share and/or receive media content. Other structures for payments may also be used in other embodiments.

Regardless of the payment structure used, in an example in which credits can be provided for reviewing or using content of third parties, reductions to subscription or other fees may occur based on the user's review or use of third party content. In some industries, it may be advisable to limit credits for using third party content. For instance, a medical professional may not receive credits or other payments for using videos of different providers (e.g., to avoid anti-kickback laws or regulations, etc.). That medical professional could, however, potentially receive credits for reviewing content of third parties, when such credit is independent of whether or not the content is actually used. Thus, a doctor wanting a patient to have information about how to, for instance, properly use a medical device may search for content. Upon finding content from the manufacturer or distributor of the medical device (or others), the doctor could review the information and ultimately send the video or other content to a patient if it would be helpful or educational. Any credit, reward, payment, etc., could potentially be based on review of the information and not on actual sending or use of the video so as to avoid the implication that the doctor chose a particular medical device because it would provide a monetary or financial benefit. In other industries or for other cases, actual sending or playback of video or other information could be used to determine the reward, credit, payment, etc. Such a reward, credit, payment, etc., could be fixed by a provider of the computing system 200. In other embodiments, the third party may provide the reward, credit, payment, etc.

In another embodiment, a media sharing application 234 may include a real-time image transfer module 244. As discussed herein, a provider, end user, or third party may create video or other content. In some embodiments, such media content may be created and stored locally on a device and then attached to an email or other message, uploaded to a server, or the like. In at least some embodiments, however, the content may be uploaded in real-time, or in near real-time, with its creation. The real-time image transfer module 244 may therefore start uploading content as it is being created, and without waiting for completion of the content. This may be for any type of content, including video content. Thus, as a video is captured, it may be continuously uploaded to a server or cloud-based component even prior to its completion.

The computing system 200 of FIG. 2 is but one example of a suitable system that may be used as an end user device, a server component, or a system within a communication or other computing network. In other embodiments, other types of systems, applications, I/O devices, communication components or the like may be included. Additionally, a media sharing application 234 may share more than just video, audio, presentation data, or other information stored in the stored media 226, including media on a distributed system, cloud, or which is otherwise available from a local, remote or other source.

Figure 3:
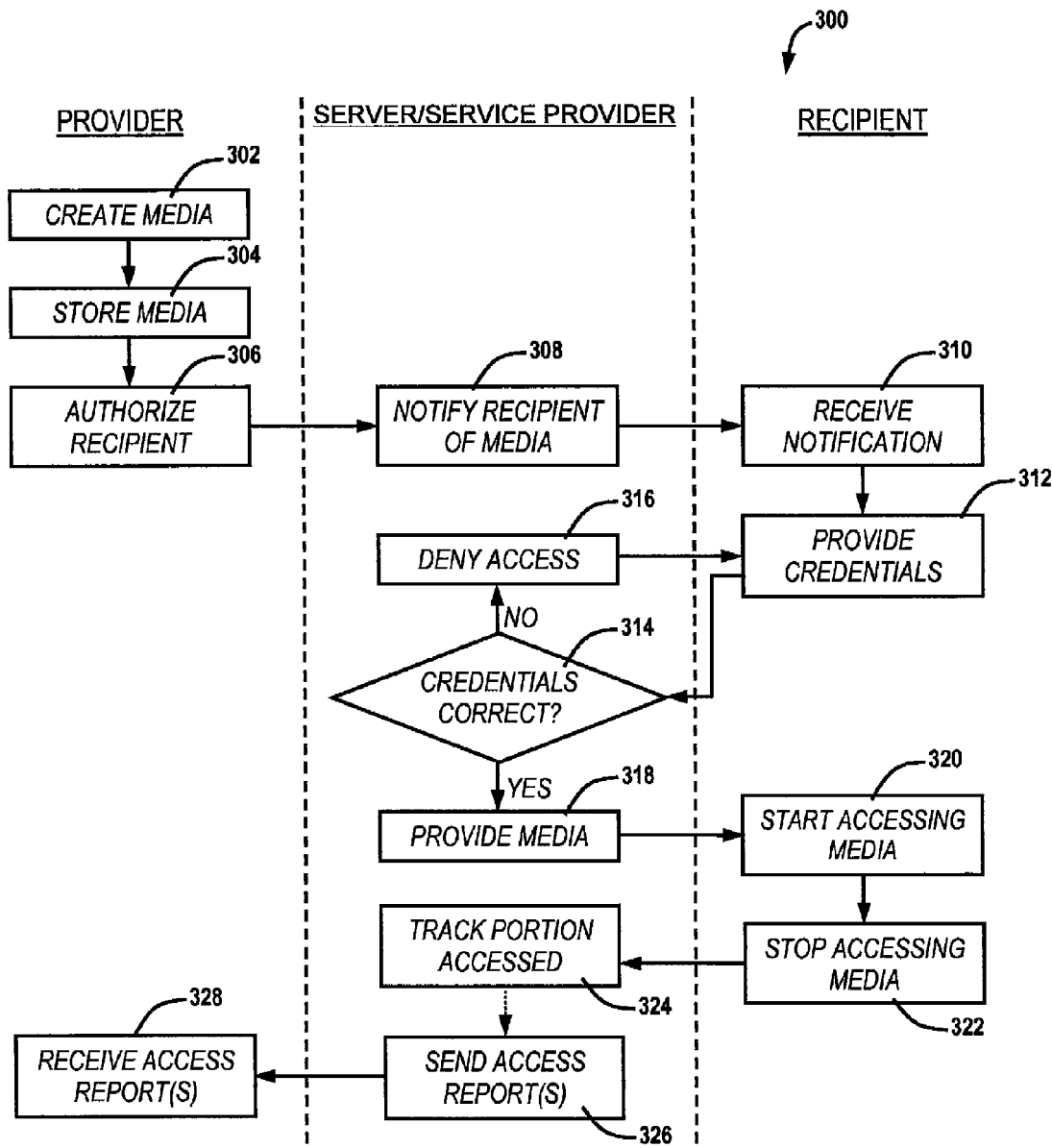
FIG. 3 illustrates an embodiment of a method for enabling a provider to share information with a recipient, and to report when the information has been accessed or reviewed to the provider.

FIG. 3 illustrates an embodiment of a method 300 for sharing information with a recipient (e.g., to educate or inform the recipient, etc.), and for reporting to a provider or sender of the information on whether the information has been accessed or reviewed by the recipient. The method 300 may be performed by or within the systems of FIG. 1 or FIG. 2; however, the method 300 may also be performed by or in connection with other systems or devices.

In accordance with one embodiment, the method 300 may include an act of creating media (act 302) and storing the created media (act 304). Sometimes the acts 302, 304 may occur simultaneously, although they may also occur in sequence, as shown in FIG. 3. Such acts may be performed by the provider, who shares information with the recipient. Alternatively, media may be created by a third party in act 302. For instance, in the context where the provider is a medical professional, the medical professional may create a personalized video for the recipient, or may create general videos to send to the professional's patients. Alternatively, a drug or medical device manufacturer, or a therapy provider, may create a video or presentation and make the media available to medical professionals. The medical professional may then review available media and choose which media is best suited for educating the medical professional's patient. Thus, in some embodiments, the act 302 of creating media and/or the act 304 of storing media may be replaced by an act in which a provider provides access to previously created media (not shown). Further, storing the media in act 304 may occur locally and/or remotely. For instance, a video or other type of content may be created and stored on a local computing device. Thereafter, the content may be optionally uploaded or sent to a server or other user. In other embodiments, storing the media or content in act 304 may occur on a remote device, such as where video or other content is uploaded in near real-time with its creation. Upload of video or other content may occur automatically or at a user's request. In some embodiments, upload may occur automatically based on the type of content (e.g., high definition video may be uploaded automatically, etc.), although in other embodiments, upload of the data may occur automatically regardless of the type of data. In still other embodiments, a user may select which data should be uploaded in real-time with creation.

Regardless of whether the provider wanting to share the information with a recipient creates or merely accesses the media or creates new media, and regardless of where the media are stored in act 304, such an entity may authorize a recipient to view the media or otherwise access the information (act 306). Such authorization may be performed in a number of manners. For instance, the provider may send the media to the recipient (e.g., by email, as an in-app notification, etc.), with the email or notification acting as authorization to access the media. The provider may also associate the media with authorization credentials of the recipient, or with other secret keys, passwords, biometric data, or other authentication data. In another embodiment, the provider may notify a third party (e.g., a website or service provider, etc.) that the media is to be shared with the recipient (which in some embodiments may trigger fees or payments for reviewing and/or sharing third-party content). In that embodiment, accessing a link, website, application, or the like may act as authorization, or it may trigger a request for a provider or a recipient to enter proper credentials.

Regardless of the manner in which the authorization is made, the recipient may be notified of the available media (act 308). In FIG. 3, the notification is shown as being performed by a server or service provider. Such a server or service provider may be an intermediary between the provider and the recipient that generates notifications once an authorization is created (e.g., such as where a provider and a recipient each access a website to upload or view videos, etc.). In another embodiment, the notification may be made by the provider directly.

The recipient may receive an email or other notification (act 310) indicating that content or media is available. The recipient may then proceed to access the media. Optionally, prior to viewing the media, the user may be required to supply his or her credentials (act 312) or otherwise provide some authentication information. Providing the credentials in act 312 may take any number of different forms. As discussed herein, such an act may include entering a password on a video file sent to the recipient. In another embodiment, a user name and/or password may be entered at a website or in an application to grant the user access to the shared video. Moreover, while FIG. 3 illustrates the credentials being provided to access the media (act 312), in some embodiments the notification itself may be protected and may require some authentication. In other embodiments, no credentials may be required or used.

If credentials are used, once the credentials have been provided they may be verified to determine if they are correct (act 314). If the credentials are incorrect, the recipient may be denied access (act 316) and may again attempt to provide credentials (act 312). In other embodiments, however, security settings are contemplated which could lock the user out of the media or notification if incorrect credentials are received (may be after one attempt, two attempts, etc.). If the credentials are correct, a notification may be accessed or media (or access to the media) may be provided (act 318). As shown in FIG. 3, the verification of credentials may be performed by a server and/or service provider. Thus, a website providing an interface to both the provider and recipient may provide the media or authorize the recipient to access the media in act 318 if the supplied credentials are correct. Of course, a stand-alone application on the computing system of the recipient or provider may also be used to verify credentials or provide access to media.

Once the media has been provided in act 318, the recipient can choose to start viewing, reading, listening to, or otherwise accessing the media (act 320). At some point, the recipient will stop viewing, listening to, reading, or otherwise accessing the media (act 322). This may occur when the user comes to an end of the media, or at some point between the start and the end of the media. Regardless of the amount accessed, the method 300 may contemplate tracking which portion of the media was accessed. Thus, if the entirety of the media was reviewed, the act 324 of tracking may so indicate. If only a portion was accessed, the act 324 of tracking may indicate that only a portion was reviewed. When the tracking information indicates only a portion was accessed, the act 324 of tracking may also store information about which portion of the media was accessed, how much of the entire media was accessed, when the access occurred, and the like. Thus, in the context of media that includes a video, if a recipient stops playing the video in act 322 at a time of 00:13:56 into the video, the act 324 of tracking may indicate the point at which playback of the video was stopped. Tracking information in act 324 may also track other information, including the date/time when the recipient played all or a portion of the video. If the recipient viewed portions at different times, each time may be tracked or only the most recent or most complete viewing may be tracked. Review of audio files, multimedia presentations, page-based documents or presentations, and other types of media may also be tracked in a similar manner.

To facilitate tracking of the information, one embodiment of the present disclosure contemplates a service provider such as a website or server providing access to the media. The media may be streamed to the user over a network (e.g., network 102 of FIG. 1, etc.). Thus, if a recipient stops the streaming service, the service provider may be able to track at what point in the media data streaming was halted. In other embodiments, the media may be downloaded so as to be accessed by the recipient without continuously involving a service provider in the presentation of the media. In such an embodiment, an application or script may be provided to monitor the review of the media. The application or script may track information related to review of the media and optionally send the tracked information back to a service provider or the provider.

The above is but one example of how to track information in act 324, and the particular manner of tracking in act 324 may be varied in any number of manners. In one embodiment, for instance, a server may track a call or request for data. The video may be presented in a browser, mobile application or other interface and can include code that makes web requests (e.g., HTTP POST requests, etc.) to the server during playback. Such requests may provide the current percentage of the video that has been played. The server can then store the information in a table or database, and potentially associate such information with an identifier for a particular message (e.g., a message from a provider to a recipient, etc.). Events may be published based on the percentage viewed and the message identifier.

By tracking the information about whether the recipient played the provided information, a report or other information about what was played may be sent to, or generated by, the provider who authorized or requested that the recipient review the information (act 326). The provider may receive one or more reports (act 328), which reports may be sent automatically or upon request. For instance, a report may automatically be generated after a period of time to give the provider information on whether the media information was reviewed and/or to what extent it was reviewed. In another embodiment, only information not reviewed, or not sufficiently reviewed, may be made a part of a report. A single report, or multiple reports, may thus be provided and can be timed or triggered based on when media was shared, or even on when media was played or not played. Reports may be tailored to a single person, or may be cumulative for a provider who sends media to multiple recipients. Optionally, upon viewing one or more of the reports, the provider may make contact with the recipient (e.g., if the information was insufficiently reviewed, etc.), re-send the information to the recipient, do nothing, or take some other action.

Reports based on the tracking in act 324 may also be accessed upon request of the provider. For instance, rather than sending an access report automatically, a provider may request information on what portion of the media was accessed. A provider may, for instance, view a history of past media sent, and specifically request information on which media has been played, the extent the media has been played, etc. Optionally, such a report may occur automatically. For instance, upon viewing a history of media sent, information on the extent played may be presented textually, graphically, or in other manners. Thus, an access report may have any number of different structures, and may include simply a notification or even an icon.

In practice, the manner of providing information, including reporting information in act 328, to the provider about what portion of provided media has been accessed may be performed in any number of manners. In accordance with at least one aspect, an application running on a computing device (e.g., a mobile application, etc.) may open a web socket and listen for events corresponding to a message that has not yet been fully played. Such message may be identified using an identifier (e.g., an identifier associated with the particular message, etc.). When a server of a video hosting service publishes events, the events can be distributed to all listeners interested in the particular message identifier. For instance, an application on the computing device may be an interested listener, and can then receive real-time updates on what portion of shared media has been played. Any identifiers associated with messages not relevant to the particular listener may be ignored to avoid unnecessary network traffic.

In some embodiments, the ability to listen over a network may not be present. For instance, an application may not be running, a network may be unavailable, or the like. In such an instance, when the application is restarted, when a network again becomes available, or in other circumstances where communication was interrupted, the application or other code can request that the server provide the status of relevant messages (e.g., messages from a particular provider, etc.). Proprietary or standard protocols may be used, for instance, to make a web request. A response may then be received which can provide up to the moment information on the percentage of the media that has been played. A web socket can then be opened to listen for events as described previously. As discussed herein, whether reporting information is received in real-time or after a delay (e.g., on request, at predetermined intervals, etc.), the provider of the media can receive information indicating whether the media has been played in its entirety, what percentage of the media has been played, or the like.

Although the media sharing application 234 of FIG. 2 and the method 300 of FIG. 3 may be used in the context of sharing video information, it should be appreciated by one of ordinary skill in the art in view of the disclosure herein that the media sharing application 234 and the method 300 may be used for any number of different types of information other than or in addition to video. For instance, similar components or methods may be used to share audio, still image, multimedia, textual, or other information. By way of illustration, multimedia or textual information may be shared in a paginated format. As a user changes pages, a system, component or method may track which pages have been reviewed. Information about whether a recipient has accessed provided information (and optionally to what extent the provided information has been viewed) can be reported back to a service provider, the entity who authorized the recipient to review the information, or the provider or creator of the information. Thus, information can be tracked to determine if the recipient has accessed the provided information so as to potentially learn from the provided information. In some contexts, such reporting may also be used for marketing purposes. For instance, a third party providing or selling media (e.g., an online book publisher, music retailer, etc.) may be given reports to indicate what content is being accessed, how much is being accessed, what time frames are involved in accessing and reviewing the media, what portions of the media appear to be the most popular among multiple recipients and the like. Such reports to third parties are optionally scrubbed of personally identifiable information so that information about the customer, patient, or other recipient is protected.

Figure 4:
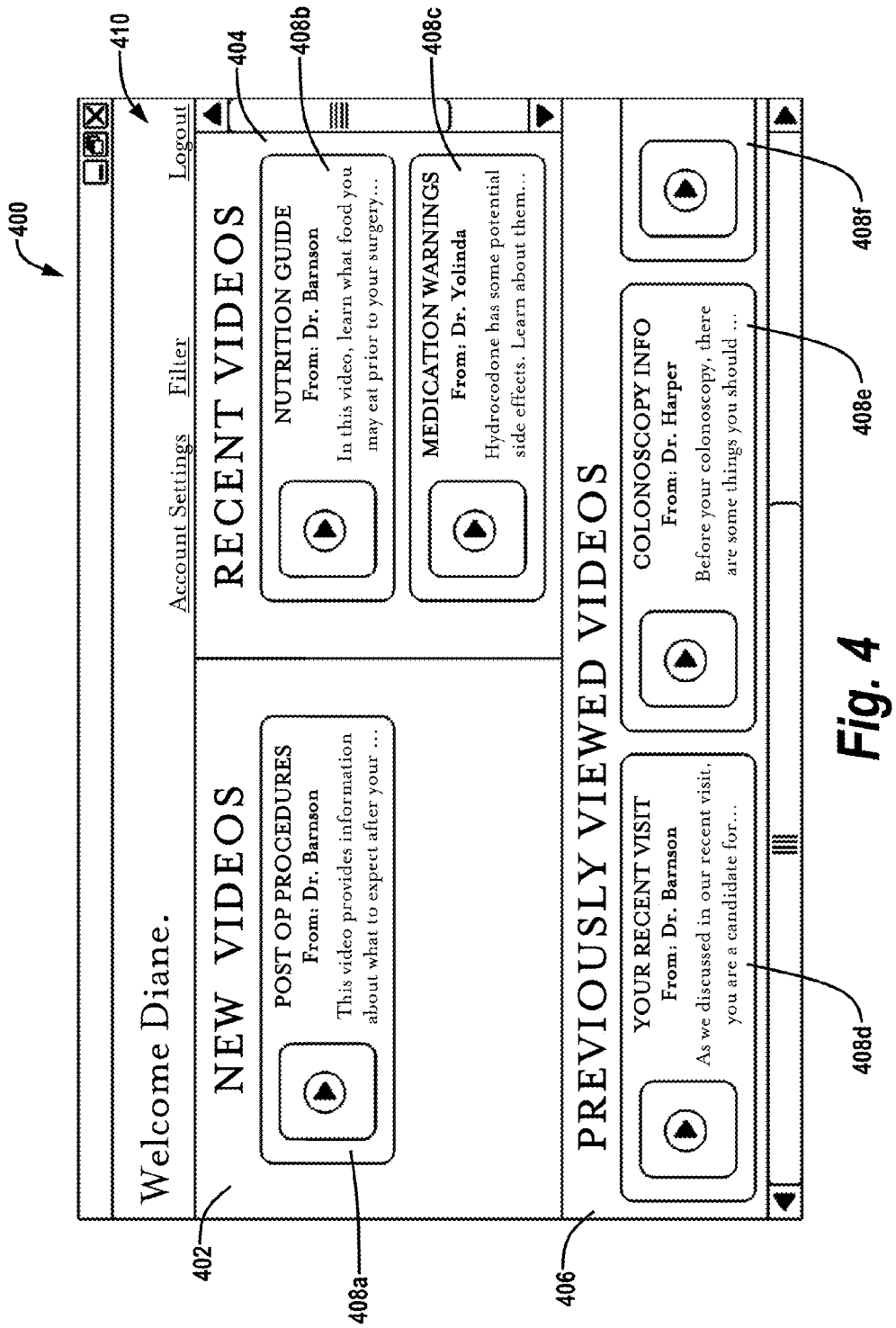
FIG. 4 illustrates an embodiment of a user interface for a recipient of media data to view data shared by one or more providers.
Figure 5:
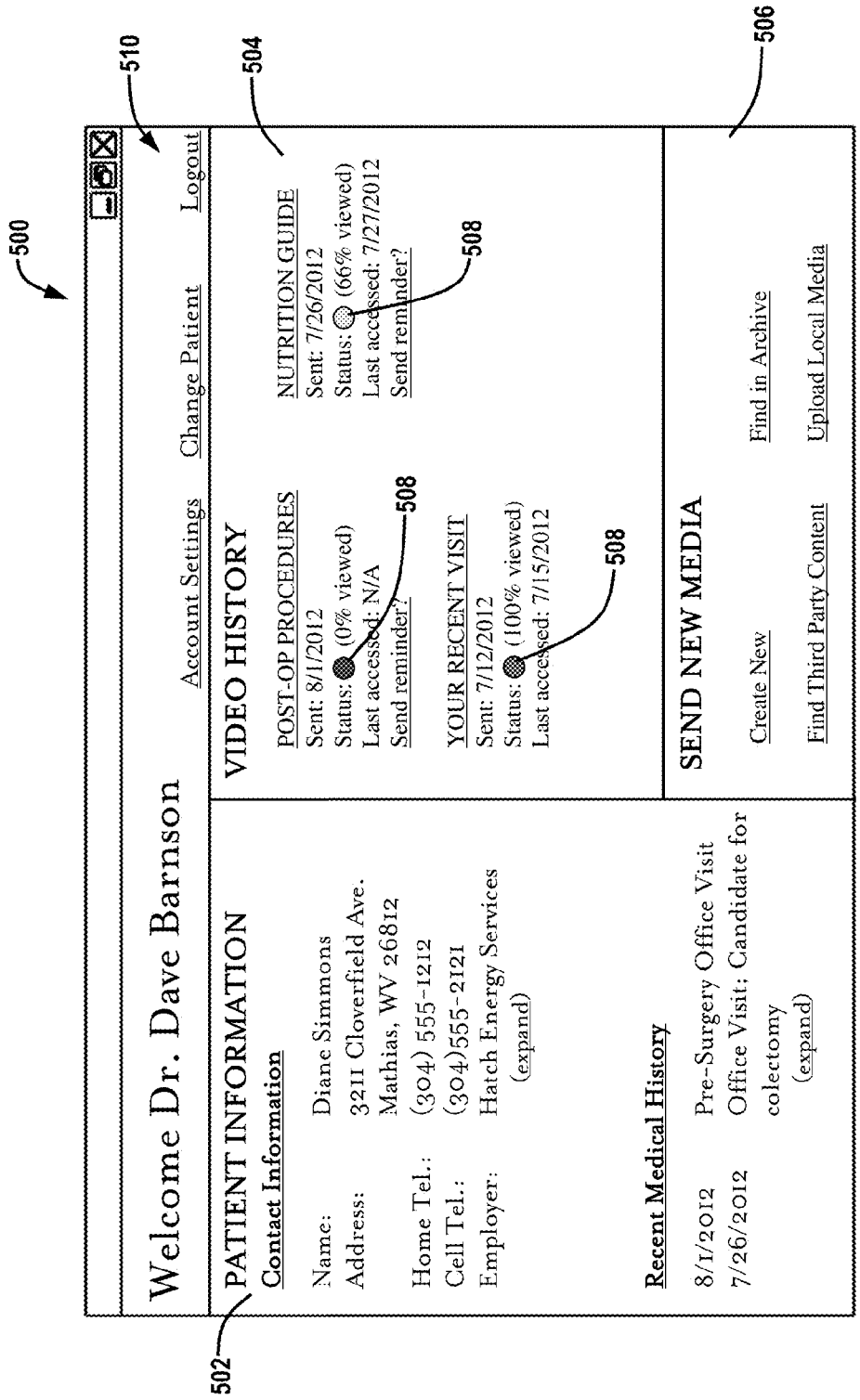
FIG. 5 illustrates an embodiment of a user interface for a data provider to view data shared with one or more recipients.

Aspects of the present disclosure may further be understood in the context of using a website or service provider to enable recipients to review information shared by one or more information providers. FIGS. 4 and 5 illustrate example display devices showing user interfaces that may enable a recipient to view and learn from shared information and/or a service provider to share information or view whether a recipient has accessed the shared information.

In particular, FIG. 4 illustrates an example user interface 400 which may be provided to a recipient who has been requested to view one or more videos, although the same interface, or similar interfaces, may be provided for review of audio data, still images, multimedia presentations, documents, textual information (e.g., books, articles, etc.), or other media. In this embodiment, the user interface 400 may enable the user to view videos shared by one or more providers, and to potentially view such videos multiple times. The user interface 400 is provided purely as an example of a suitable interface and is not intended to show any information or components that are required for any embodiment.

In the user interface 400 of FIG. 4, a recipient may be given the ability to view videos or other media when the recipient is authorized or requested to do so. The recipient may login to a website providing the user interface 400 to determine whether videos are available and/or whether other notifications have been received. For instance, an email, text message, or other notification could be provided to let the recipient know that the information is available and, optionally, enable the recipient to link to the information. In some cases, a direct link may be provided to the information so as to bypass or directly access the user interface 400. An email or other message could also attach the video or other information to bypass the user interface 400.

In FIG. 4, recently authorized videos may be shown in a new videos pane 402. In this particular embodiment only one new video is provided. This particular video relates to a video from a Dr. Barnson, the provider, and has information related to post-operation procedures that the doctor determined would be of interest to his patient, the recipient. Optionally, the video may include information that was conveyed in an office or other meeting to the patient, but enables the patient to review the information in more detail at his or her leisure.

To watch the video, the recipient may simply click or otherwise select the video, after which the user interface 400 may display the video (e.g., using an appropriate media player, plug-in, extension, or the like, or by downloading the video to the recipient's computing system, etc.).

If the patient had previously been requested to review videos, those prior videos may also be available in one or more additional panes 404, 406. In this particular embodiment, recent videos are shown in one pane 404 while previously viewed videos may be shown in another pane 406. The patient may be able to scroll in the panes 402-406 to view different videos that may be available. Thus, while the illustrated embodiment shows six available videos (i.e., one new video 408a, two recent videos 408b, 408c, and three previously viewed videos 408d-408f), more or fewer videos may be available.

Available videos may be displayed along with any relevant information. Information may include a title of the video, the identity of the provider, and a short description of the video. Other information may include the date/time a video was sent, an indication of whether the video has been fully or partially played, a duration of the video, or other information. As an example, one embodiment may include different panes that provide access to videos based on the amount of the video played. If a video hasn't been played at all, it may appear in one pane. A video partially played (or partially played below a threshold amount of time) may appear in a second pane, while videos that have been fully played (or played to a percent above a particular threshold of time) may appear in a third pane. Of course, rather than different panes, different windows, lists, or other categories may be provided for playing or viewing available videos or providing information on videos.

As another example, some information may be provided for mandatory review by the patient, while other information may be optional. A provider may designate information which is mandatory to indicate which information the patient or other recipient must review, and thus requires the user to take action to review the information. For a medical procedure, for instance, the patient may be required to review a video providing information on what the patient can or can't eat prior to the procedure, a description of risks and potential complications, or other information. Information not identified as mandatory may be optional. Optional information could include other information that would be helpful for the patient to know, but may not be critical or may have nice but unnecessary details. Mandatory versus optional information may be designated in any suitable manner, including using different window panes, lists, or panels for the different types of information. In other embodiments, differentiation may be made in other manners (e.g., text, highlighting, automatic-ordering, symbols or icons, etc.).

As also shown in FIG. 4, the user interface 400 optionally provides access to videos that more than one provider may supply. In this case, the patient may have seen three doctors (e.g., Dr. Barnson, Dr. Yolinda, and Dr. Harper), each of whom supplied some video information for the patient to review. If the patient wanted to view only those videos from a particular doctor or other provider, the patient could click or select the name of the doctor in one of the videos or use another filter mechanism For instance, a preferences section 410 of the user interface 400 may include an option to filter videos according to one or more criteria (e.g., date, content, provider, playback status, length, mandatory vs. optional, etc.). The preferences section 410 may also provide other options, such as to set account options or logout.

A provider may also have information that the provider wants to view with respect to video, audio, presentation or other media data shared with a recipient. For instance, a specialist of some type may share information with one or more people and want to review the information shared, add new information to share, track the recipient's progress in reviewing the information, review third party content for sharing, and the like. FIG. 5 illustrates an example of a display device showing a user interface 500 that may be used when the specialist is a doctor or other medical professional, although a similar interface may be used by many other professionals or specialists, or even any other type of information provider. Indeed, a parent may use a similar system to share information with a child.

In this particular embodiment, a provider may login or otherwise access a website or service. In a medical context, the provider may be a doctor, hospital, or other provider. In some embodiments, a provider may share access, or authorize access to other providers. For instance, a doctor may share information; however, the doctor may authorize other doctors, nurses, medical assistants, or other staff members to access the doctor's information to check on patients, produce reports, view a patient's progress in reviewing information, and the like. The user interface 500 may thus act as a dashboard for managing and controlling delivery of media information to patients or other recipients, but may also include settings for managing accounts across a larger provider entity (e.g., a doctor's office, a hospital, an insurance company, etc.).

In the example user interface 500 of FIG. 5, selection of a recipient for media information (e.g., a patient, etc.) may cause information relating to that recipient to be displayed. In this case, a patient information pane 502 may display contact information, medical information, or other information for the patient. One or more other portions of the user interface 500 may also enable for the provider to send information to the patient and/or review whether a patient has reviewed previously supplied information. In FIG. 5, for instance, a video history pane 504 may display information on past videos or other information sent to the patient. In this particular example, three videos were previously sent to the patient. Certain information may be provided about each video and, in this case, includes the title of the video (optionally with a link to the video or more information about the video). Other information may include the date/time the video was sent to the patient, information about whether the patient has played the video, the duration of the video, the creator of the video, and the like.

In this case, one video has not been played at all, one has been partially played, and another has been fully played. An optional status indicator 508 may be provided to enable a provider to easily see whether some action needs to be taken or whether there is a concern the recipient may be unaware of some information. The status indicator 508 may be color-coded based on the extent to which the user has played a video. As an example, the status indicator 508 may be green if the user has fully played a video, or if the user has played above some threshold percentage of the video (e.g, more than 80%, more than 90%, more than 95%, etc.). A red status indicator 508 may indicate that the recipient has not played any of the video or has played a level below a particular threshold (e.g., less than 5%, less than 10%, less than 20%, etc.). If the status indicator 508 is yellow, it may indicate that the user has played some of the video, but not all of the video, or that the user has played less than a desired portion (e.g., between a lower and an upper threshold). Where the video has not been played fully, an option may also be provided by the user interface 500 to enable the provider to remind the patient to view a particular video. Instead of sending a reminder, the audio, video, multimedia, text, or other educational information may simply be resent (or a notification resent) by selecting a corresponding option. In other embodiments, however, an automated system to send reminders or resend materials may be utilized as discussed herein.

The example status indicator 508 is purely illustrative. In other embodiments, for instance, the status indicator 508 may be eliminated or may be included with other components. FIG. 5, for instance, shows the status indicator 508 in addition to a description of the percentage of a video that has been played. Rather than having a separate status indicator 508, the percentage of the video that has been played may be colored, include a symbol or icon (e.g., a check mark or smile for complete, a frown for incomplete, etc.) or be otherwise stylized to provide a quick, visual indication of whether a recipient has played all, some or none of a video. Different arrangements, filter options, window panes, and the like may also be provided in the user interface 500 to arrange data based on the percent to which the recipient has accessed the media.

The user interface 500 may also include an option for a provider to send a new video to the recipient for his or her review. FIG. 5, for instance, includes a new media pane 506 which enables a provider to create or send a new media, such as a video. A provider may, for instance, use a camera to create a video in real-time to provide some information to the recipient. Alternatively, a pre-recorded video may be accessed. Thus, the new video pane 506 provides options to create a new video or select a video from an archive, such as may be the case for a pre-recorded video. If the provider selects an option to create a new video, the user interface 500 may change or an additional window may populate to provide a view from a camera for recording. If a pre-recorded video is to be sent or otherwise shared, the video may be a standard video for a particular therapy, treatment, surgery, medication, or the like. The pre-recorded video may also have other forms, and may be customized for the patient or other recipient in some embodiments. For instance, a doctor may record all or a portion of an office session and send an informative portion to the patient to remind his or her patient of topics discussed. In other embodiments, third party content may be searched to identify relevant information, or a video stored locally may be uploaded to the service.

Of course, the doctor or other provider may send information to the patient. For instance, regardless of how the information to be sent is identified, the provider may, upon identifying the information, send the information to the patient or other recipient. In one embodiment, for instance, email or another similar service may be used. In this context, the user interface 500 may act as an interface for a video mail system which sends information in the form of a video via email (e.g., as an attachment, embedded within a scripted page, with a link to the hosted video, etc.). In such context, a recipient may not even need or use a recipient-side interface such as that shown in FIG. 4, but may instead use a standard email or other messaging service. In other embodiments, the information may be sent in other manners. As an example, the information may be uploaded to a particular network location, and then a notification may be sent to enable the recipient to access the information. For instance, an email may be sent telling a provider to login to a service such as that shown in FIG. 4. Of course, the provider may also send information to many different recipients. A setting section 510 thus enables a provider to change the patient being reviewed or requested to review information, as well as options to change or view account settings, or to logout of the service.

Information sent to a patient in a medical context may include various types of information as discussed herein. The shared information may be provided to educate the patient about prescriptions, medical procedures, and the like. The educational and communication system disclosed herein may also be used to send surveys, questionnaires, tests, and the like. A survey or test, for instance, may be sent to a patient to obtain information about the patient's recovery, to obtain information on how well the patient is following instructions, to get information on complications, and the like. Questions presented to the patient may also test the patient's understanding of other information shared by a provider. Thus, if a patient is sent a video describing certain actions to take prior to surgery, a follow-up test or questionnaire may be used to see if the patient understood the received information and/or measure the patient's progress. Surveys may also be provided to measure the efficacy of the educational information itself. For instance, a simple survey may request or require that the recipient indicate whether the provided information was very helpful, helpful, not helpful, or the like, and may optionally include an input area for explaining the recipient's response.

While FIGS. 4 and 5 and various examples provided herein are specifically in the context of a healthcare provider providing video information to patients, it should be appreciated that such examples are provided merely to illustrate one example of a manner in which systems, methods, software, and computer-readable media of the present disclosure may be used to share information and/or report on the review of shared information. In other embodiments, information may be shared and reported for other or additional fields.

For instance, a legal professional, as a provider, may provide information related to the risks associated with a particular business decision, a particular legal action, or the like. To enable a client, as a recipient, to make an informed decision, audio, video or other information may be shared. When the client then sits down to make a decision (either alone or with others), the client may review the risks so as not to fully rely on his or her memory.

Other fields may also use this technology. A product developer (e.g., electrical, software, mechanical, pharmaceutical, or other product, etc.) may create a video to enable a client to view new components. On the opposite end, a designer may create video or other information to highlight certain bugs or problems with a prototype. Fields related to sports (e.g., player scouting, etc.), news reporting (e.g., sharing of video feed for recent events, etc.), education (e.g., sharing of classroom activities, child's performance, lab instructions, etc.), and the like may also share information and/or see when shared information has been accessed or the extent to which it has been played or reviewed.

FIGS. 4 and 5 further illustrate an example in which a computing device such as a desktop or laptop computer may be used to access an interface via a browser or dedicated application. In other embodiments, however, embodiments of the present disclosure may be used in connection with mobile devices such as mobile phones, tablet computing devices, e-readers, PDAs, media players, and the like. Such devices may be used by providers and/or receivers of content.

Figure 6B:
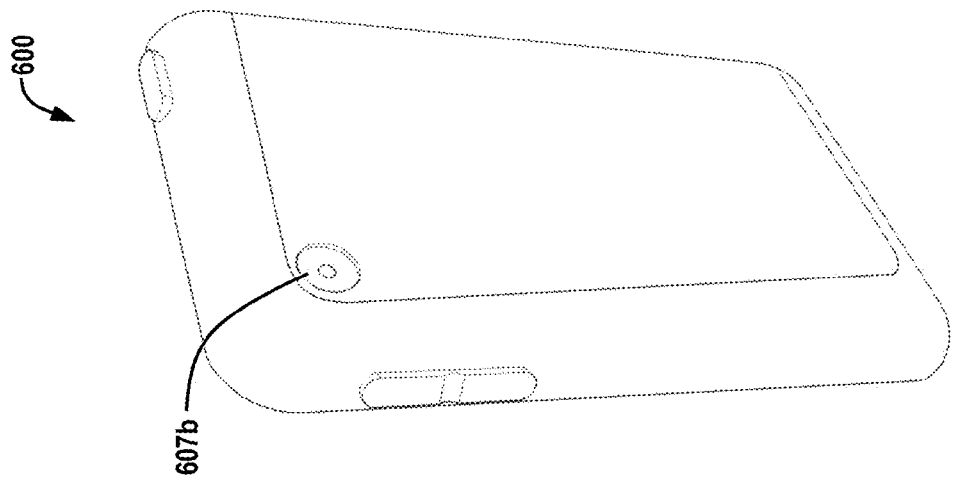
FIGS. 6A and 6B are perspective views of an embodiment of a mobile device having a display and one or more cameras.
Figure 6A:
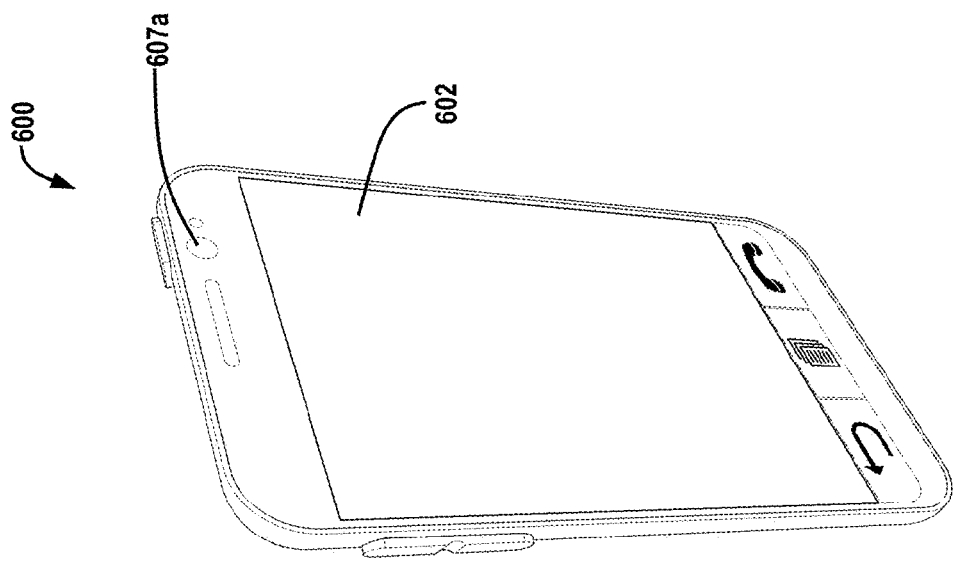

FIGS. 6A and 6B illustrate an embodiment of a mobile device 600 that may be used in connection with embodiments of the present disclosure. The illustrated mobile device 600 is an example of one type of mobile device which may be used in connection with embodiments of the present disclosure to record, access, send, retrieve, or otherwise share video or other rich content. In particular, the mobile device 600 may represent a mobile phone (e.g., a so-called "smart phone," etc.). In other embodiments, the mobile device may take other forms. For instance, the mobile device may be a personal digital assistant (PDA), tablet computing device, netbook, e-reader, laptop computer, personal media player (e.g., MP3 player, etc.), global positioning satellite (GPS) receiver, another device capable of taking still photographs or video images, or the like.

In the illustrated embodiment, the mobile device 600 includes a display 602 and two cameras 607a, 607b. In particular, the camera 607a is shown as a front-facing camera. A front-facing camera 607a may be used to take still photographs or videos of a person or other object that is located in front of the display 602. The other camera 607b is illustrated as a rear-facing camera. The images captured using the rear-facing camera 607b may be those images located to the rear of the mobile device 600 (i.e., on a side of the mobile device 600 opposite the display 602).

Whether the front-facing camera 607a or the rear-facing camera 607b is in use, the mobile device 600 optionally displays a captured image on the display 602. Thus, if the provider is using the front-facing camera 607a, a video of the provider and/or the provider's surroundings may be provided on the display 602 and viewed by the provider. Similarly, if the provider is using the rear-facing camera 607b, some other person or object may be displayed on the display 602. In accordance with some embodiments, the display 602 may be configured to display the images as they change. Thus, the display 602 may provide a real-time view of the objects within the capture area of the then active camera 607a, 607b.

The mobile device 600 may be used to record videos that can be sent to a recipient. Such video may be sent using a system as described herein, or in other manners. The mobile device 600 may thus also include the features and/or components of the computing system 200 of FIG. 2.

As should be appreciated in view of the disclosure herein, the mobile device 600 or another device may include a camera (e.g., front or rear facing cameras 607a, 607b) that can be used to record video. When the video is recorded, the video itself may be stored on removable and/or fixed storage of the mobile device 600. Thereafter, the video can be sent to a recipient. For instance, the video can be sent as an attachment to an email or other messaging service. The video could also be uploaded to a remote location and a link to the video could be provided. Certain other embodiments may, however, contemplate uploading the video to a remote location even prior to completion of the video. In such an embodiment, the recorded video may be uploaded automatically, and in real-time, or near real-time, as the video is recorded.

Figure 7:
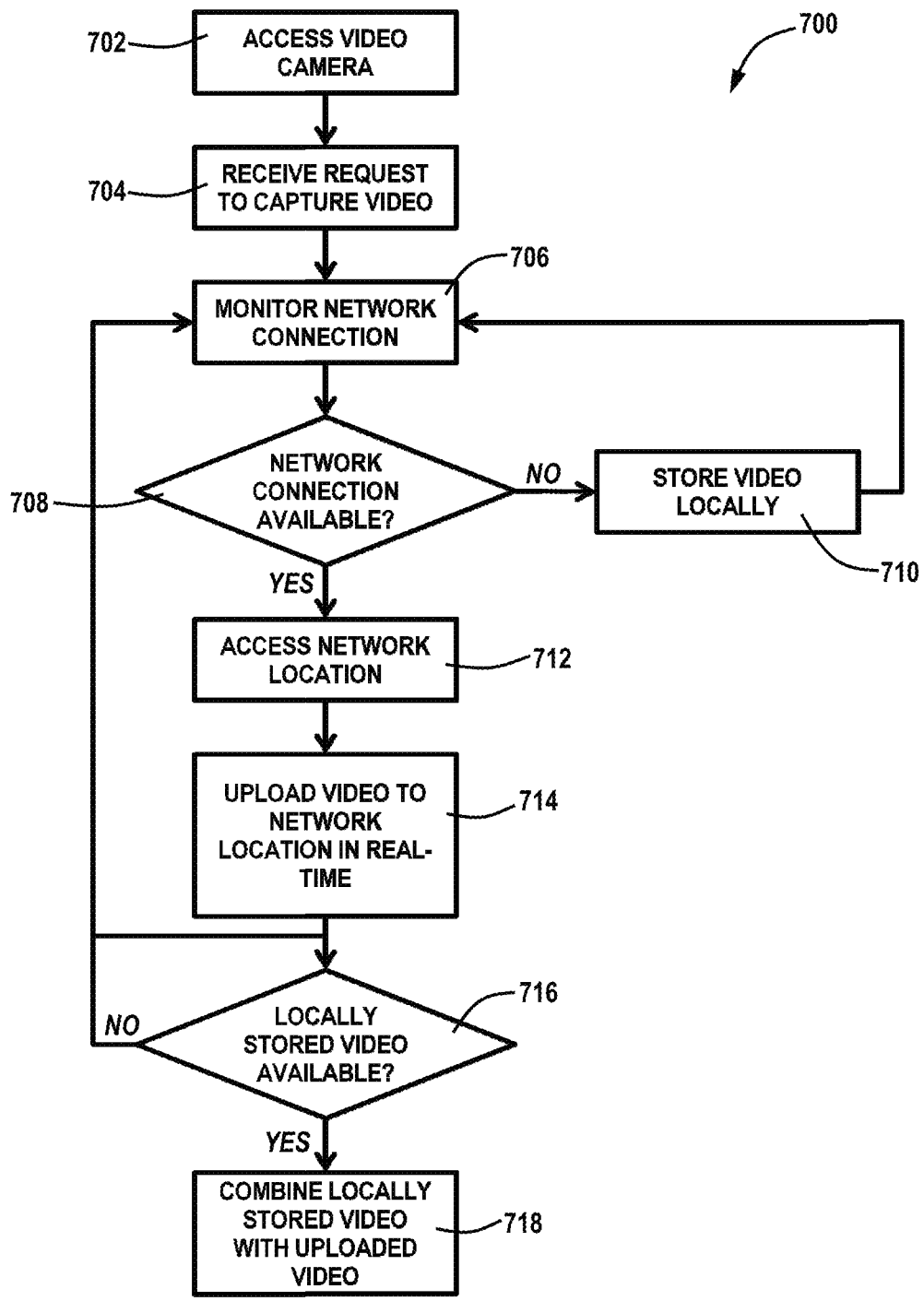
FIG. 7 illustrates an embodiment of a method for capturing image data and uploading it in real-time to a network accessible location.

FIG. 7 illustrates an embodiment of a method 700 for capturing video and real-time (or near real-time) uploading of the video to a remote location. In this particular embodiment, a video camera may be accessed (act 702). Access of the video camera in act 702 may include, for instance, selecting a camera to use on a mobile computing device, or on another computing device optionally connected to a network (e.g., network 102 of FIG. 1, etc.).

After accessing a video camera in act 702, a request may be received to capture video (act 704). In at least some embodiments, the request received in act 704 may include receiving provider input in the form of a record request. As an example, a touch-screen on a mobile device may display a record "button." Upon actuation of the record button, the mobile device may cause the camera to capture one or more images and record the image(s) captured by the camera.

The computing device with the camera may have the ability to access a network and/or a remote location in order to upload content in real-time with its capture. Such access may be wireless or wired. For instance, a mobile device or other device may have wireless network connectivity via a cellular interface (e.g., GSM, CDMA, LTE, HSPA+) or other technology (e.g., 802.11/WiFi, Bluetooth, near-field communication, etc.). In other embodiments, a hard-wired connection (e.g., an Ethernet cable) may be used to access a network. Regardless of how access to a network is provided, the method 700 optionally may include an act of monitoring the network connection (act 706). Monitoring of the network connection in act 706 may enable a determination to be made as to whether uploading of the media can occur in real-time. More particularly, if no network connection is available, the system performing the method 700 may be unable to access a remote location for uploading of the video. Thus, a determination in act 708 may be performed to determine whether the network connection is available. If the network connection is not available, the method 700 may thus include an act 710 of storing the video locally on the computing system.

Alternatively, when the network connection is available as determined in act 708, the video may be uploaded. Thus, the method 700 may include an act of accessing a network location (act 712) when the network connection is available. Upon accessing the network location, the video can be uploaded to the network location in real-time (act 714). In other embodiments, the upload may occur using a buffering or other similar technology that enables video to be stored/uploaded to the network location in near real-time. When uploaded in near real-time, there may be delays between capture and storage at the network location; however, the delays may be minimal (e.g., average time between capture and storage at the remote network location may be less than 30 seconds, less than 20 seconds, less than 10 seconds, less than 5 seconds, less than 1 second, or even less than 0.5 second).

As should be appreciated in view of the disclosure herein, video of any length may be captured and stored at the network location. During the capture of the video, network conditions may change or deteriorate. Accordingly, the method 700 may continually monitor the network connection in act 706 to determine whether the connection is available (act 708) or potentially to determine whether captured video can be stored at the network location at a rate fast enough to correspond to the rate of capture. When the connection is available and fast enough for full upload, the method 700 may continually access the network location and upload video (acts 712, 714). When the connection is not available or is not fast enough for full upload, some or all content may be stored locally (act 710). Over time, as video is captured, the local storage may therefore include some video content, whether as a buffer for the network location or as overflow when the network location is inaccessible or there is reduced bandwidth. Uploading the video in method 700 may therefore also include determining whether video is stored locally (act 716). When video is stored locally, that video may be uploaded and combined with uploaded video data (act 718) to create a complete video. Of course, the network connection may continually be monitored in act 706 to ensure that real-time and locally-stored video can be transmitted and stored at the network location.

One aspect of the method 700 is that video can be uploaded to a remote location from a mobile or other computing device, and such upload may occur automatically and/or nearly in real-time with creation of the content. As a result, when a video is complete, some or even all of the video may already be stored remotely, and no specific request may therefore be needed or used following completion of the video in order to make the video available on or to a network location. Particularly in the example of high definition video or other large quantities of data, beginning the upload during creation of the content can significantly reduce the time needed after creation to upload data to a network location on a server or other location. Further, some embodiments of the method 700 may contemplate redundant storage. For instance, while uploading the video to the network location, a local copy of the video may also be stored locally. Thus, a copy could potentially be stored in both local and remote storage. In the event either copy is missing information, the other copy could then be used to provide needed video data. Checking each video copy against the other could be performed manually or even automatically during capture of the video and/or after capture of the full video.

While FIG. 7 illustrates an example method for uploading video content in real-time, or near real-time with the capture of the video, it should be appreciated that such an embodiment is merely illustrative, and additional or other steps or acts may be included in the method. For instance, the method 700 may include authentication of devices, establishing a trust relationship, creating data packets, performing error checking on data packets, and other similar acts that would be appreciated by a person of ordinary skill in the art in view of the disclosure herein. Moreover, various protocols and/or technologies could be used. For instance, open socket technology or protocols may be used to facilitate accessing a network location and uploading the video in real-time, or near real-time.

In one particular example, rapid and/or real-time (or near real-time) transfer and uploading of video (e.g., high definition, low definition, standard definition, etc.) or other content may be achieved by smart-chunking In such an embodiment, as video is being captured by a computing device, it may be written to a local file. Code, plug-ins, applications, or other modules on the computing device may rapidly read through the written file at different intervals (e.g., every 30 seconds, every 20 seconds, every 10 seconds, every 5 seconds, every 1 second, every half second, every tenth second, etc.). When reading the written file, any new data since the last read can be identified. The new data can be analyzed to identify chunks of data that are completed. Completed data may generally include data that won't change when the media file is complete. These identified chunks may then be posted to a server or network location using web requests that include the new chunks from the file.

In the above embodiment, when the video or other content is done being recorded, and the file is finalized, a rapid or real-time transfer module may make another pass through the file and pick out pieces that were not formerly completed. Such chunks can then be posted to the server or other network location as additional chunks, along with information about where the chunks fit in relation to previously uploaded chunks. The real-time transfer module may optionally also use a checksum or other error detection mechanism. A checksum may, for instance, be created for the finished file and a request may be made to the server to assemble the completed file. The server can put all the uploaded chunks together and perform an independent checksum. When the server's checksum matches the one sent by the real-time transfer module, the file matches exactly and the server can save the finished file. Using the above process, the real-time transfer module may enable only the last few bits of the media file and the assembly process to be completed after the media is done recording. As a result, the perceived upload time can be greatly reduced from a situation where upload begins after a video or other media file is completed. In any event, the normal upload procedure which occurs following creation of a video or other media file may be used as a fail-safe mechanism. For instance, if a chunk was missed, lost, corrupted, etc., or if the rapid upload fails too many times (e.g., due to limited network connectivity, low bandwidth, etc.), the real-time transfer module may upload the full file in the normal way. Even in this scenario, the final video or other media may be uploaded and the server can be assured the information is complete and correct.

Turning now to FIGS. 8A-8C, additional embodiments are illustrated to reflect interfaces, devices, systems, and methods that may be used to capture video data and upload the video data in real-time to a remote location. It should be appreciated that FIGS. 8A-8C are intended merely to illustrate some aspects of the present disclosure, and are not intended to be limiting or provide elements or features required for upload of video content in real-time.

In particular, FIGS. 8A-8C illustrate an example computing device 800 that includes a display device 802. The illustrated computing device 800 may generally represent any number of types of electronic devices capable of capturing video. Thus, while the computing device 800 is illustrated as being portable, the computing device 800 could have any number of other configurations.

The computing device 800 may therefore, but need not necessarily, be a mobile phone, smart phone, tablet computing device, e-reader, portable media player, GPS device, camera, or the like. In some embodiments, the computing device 800 may include a display device 802. The display device 802 optionally may display video data as it is captured by a camera of the computing device 800 and/or be used to playback recorded video data. For simplicity, the display device 802 is illustrated and described as being a touch-screen so that input may be received directly by the display device 802, but input could also be received in other manners, and through other input mechanisms.

In FIG. 8A, the display device 802 is shown as displaying an image that may be captured by a camera of the computing device 800. The display device 802 may also include other features or elements. For instance, a zoom feature 804 is graphically illustrated. In this particular embodiment, a provider may touch the display device 802 and move a slider of the zoom feature 804 in order to cause the camera to zoom in or out on a video. Another feature may include a flash feature 806. In this particular embodiment, the flash feature 806 may be displayed on the display device 802. By touching an icon or image associated with the flash feature 806, or performing some other gesture, the flash settings may be changed. For instance, touching the display device 802 at a location corresponding to the flash feature 806 may toggle between different settings (e.g., flash, no flash, automatic flash, etc.). Additionally, or alternatively, touching the display device 802 near the flash feature 806 may open a flash settings interface to enable a provider to set flash settings.

The zoom feature 804 and flash feature 806 are merely illustrative. In other embodiments, other features may be provided to enable for other camera settings to be adjusted. For example, capture type (e.g., video, still image, panoramic image, etc.), focus settings, resolution, shutter speed, scenes/modes, local storage locations, image contrast, image brightness, image color, or other features may be adjustable through settings accessible on the interface displayed on the display device 802.

In accordance with at least some embodiments of the present disclosure, the interface used to capture and/or display images on the display device 802 may include optional features for uploading content in real-time to a network location. FIG. 8A, for instance, illustrates a real-time image transfer settings component 808 that may be selected by a provider. In accordance with some embodiments of the present disclosure, by selecting the real-time image transfer settings component 808, a provider may turn real-time uploading of images on or off, apply settings for where to upload videos, or take other actions. In at least some embodiments, the real-time image transfer settings component 808 may be included as part of a camera application for the computing device 800, or a plug-in or other software component may add such settings to the camera application. In other embodiments, a media sharing application (e.g., media sharing application 234 of FIG. 2) may include a camera interface that also includes the real-time image transfer settings component 808). When a provider wishes to capture video, the provider may select a record button 810 by, for instance, tapping the display device 802 at a location corresponding to the record button 810.

FIG. 8B illustrates an example interface that may be displayed on the display device 802 of the computing device 800 following selection of the real-time image transfer settings component 808 of FIG. 8A. Such interface is merely illustrative and not intended to disclose all aspects that may be displayed, or even display required or necessary components.

As shown in FIG. 8B, selection of the real-time image transfer settings component 808 of FIG. 8A may direct a provider to an interface associated with a video sharing service. In some embodiments, the service and settings may enable a provider to select various storage options. In this particular embodiment, for instance, an upload section 812 may be provided to enable a provider to select whether or not to automatically upload captured videos for storage. If "Yes" is selected in this embodiment, the video sharing service may be used; however, selection of a "No" option may result in storing video only locally on the computing device 800.

If the option to upload videos is selected in upload section 812, an additional option may be provided to enable a provider to select whether or not to create a redundant or backup copy locally, at section 814. As should be appreciated in view of the disclosure herein, a provider may be able to select an option so that local and uploaded copies are stored, or an option to only store uploaded copies. Of course, a local-only option may also be provided by, for instance, disabling uploading in upload section 812.

A further section 816 may enable a provider to view or input information on the video service to be used when uploading videos. In particular, FIG. 8B illustrates an example where a storage location may be identified. Such storage location may be fixed or optionally customized by the provider. Optionally, authentication information associated with the provider (e.g., user name, password, etc.) may also be provided. In some embodiments, failure to provide valid authentication information may restrict the provider's ability to upload video data to the specified location and/or to later access the video from the network location.

It should be appreciated that applying settings as shown in FIG. 8B to select whether and/or where to upload video information is merely illustrative. In other embodiments, separate applications may be used for different storage options. A stock camera application may, for instance, be used to store local videos. The computing device 800 may include an additional video sharing application associated with a particular service provider. If that application is used to capture video, the video may automatically be uploaded even without enabling a specific setting. Different service providers may also provide different applications to enable selection of which service provider to use when uploading video.

In other embodiments, different mechanisms for capturing, storing, or uploading video may be used. FIG. 8C, for instance, illustrates another embodiment that may be used to capture images locally and/or to upload captured video. Certain features of the embodiment in FIG. 8C may be similar to those in FIG. 8A. Thus, a zoom feature 804, flash feature 806, or other settings 808 may be provided. The settings 808 of FIG. 8C may relate to real-time upload settings, or other settings of the camera or image capture.

In this particular embodiment, the display device 802 illustrates two record buttons, namely local record button 810a, and upload button 810b. By selecting either button, recording of an image may commence. In particular, selection of the local record button 810a may cause images to be captured and stored only locally. By selecting the upload button 810b, however, the image may be captured and automatically uploaded to a remote network location (which location may possibly be specified using the settings 808). In some embodiments, both record options may be active, or a different record option may be selected in the middle of recording. For instance, if a local record option is selected using the local record button 810a, a provider may later select upload button 810b while recording video. At that time, video may continue to be captured but may be uploaded instead of, or potentially in addition to, being recorded locally. Optionally, pressing the upload button 810b could cause the full video, including previously recorded portions, to be uploaded. In some embodiments, actuating the upload button 810b after completion of a locally recorded video could cause upload of the local video to immediately start.

In a similar manner, if the upload button 810b is first selected and video recording and uploading have commenced, a provider may select the local record button 810a. If this is selected, a backup may potentially be stored locally in addition to the uploaded version, or the upload could be cancelled from that point on (or any uploaded portion could be deleted from the network location and downloaded to the local device). In some embodiments, activating the local record button 810a after completion of an uploaded, recorded video could cause download of the uploaded video to immediately start.

Automatic upload of video data, image data, audio data, or other content may be used in connection with other embodiments disclosed herein. For instance, in connection with the embodiment in FIG. 5, capture of video to send to a recipient may be performed and accompanied by automatic upload of the video so that the video, or a link thereto, can be sent to the recipient.

FIG. 9 illustrates still another embodiment in which a computing device 900 may be used to send videos or other content to a recipient, and may also be used in connection with the automatic upload features described previously. In this particular embodiment, the computing device 900 may include a mobile device, but the computing device 900 could include any type of electronic or other computing device. More particularly, FIG. 9 illustrates the computing device 900 as including a display 902. In this embodiment, a browser or application may be used by a provider to view videos or other media that may be shared with a recipient. For instance, uploaded media at a network location may be viewed. Each media item 904 may be viewed to review the content and/or to send it to a recipient. More particularly, FIG. 9 illustrates that a provider may play or view each media item 904, download the media item 904 to the computing device 900, edit the media item 904, or email or otherwise send the media item 904 to a recipient. In one embodiment, sending the media item 904 may interface with an email or other similar communication system. Thus, a provider can send a message through an email system and have it received by the recipient through a standard email interface. The message may then include the video, a portion of the video, a link to the video, or the like. For instance, an email may be received indicating that the provider sent a video from the provider's email address, or from an address associated with the video hosting service provider. The recipient may then receive an option to play the video. In some embodiments, a still image from the video may also be included to enable the provider to get an idea of who is in the video, what the video is about, etc.

Figure 10B:
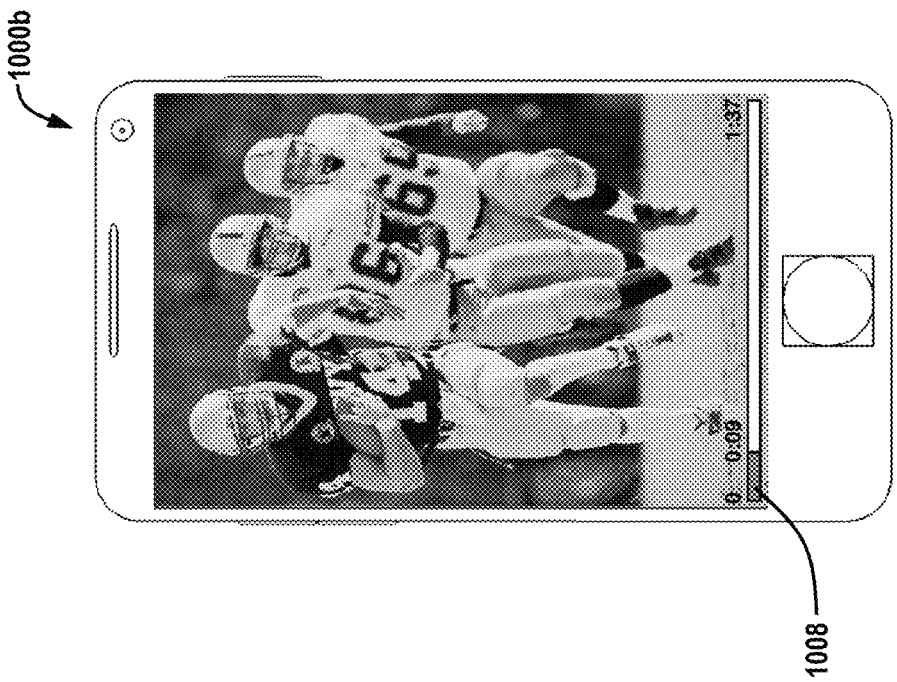
FIG. 10B illustrates an embodiment of a mobile device accessing shared image data.
Figure 10A:
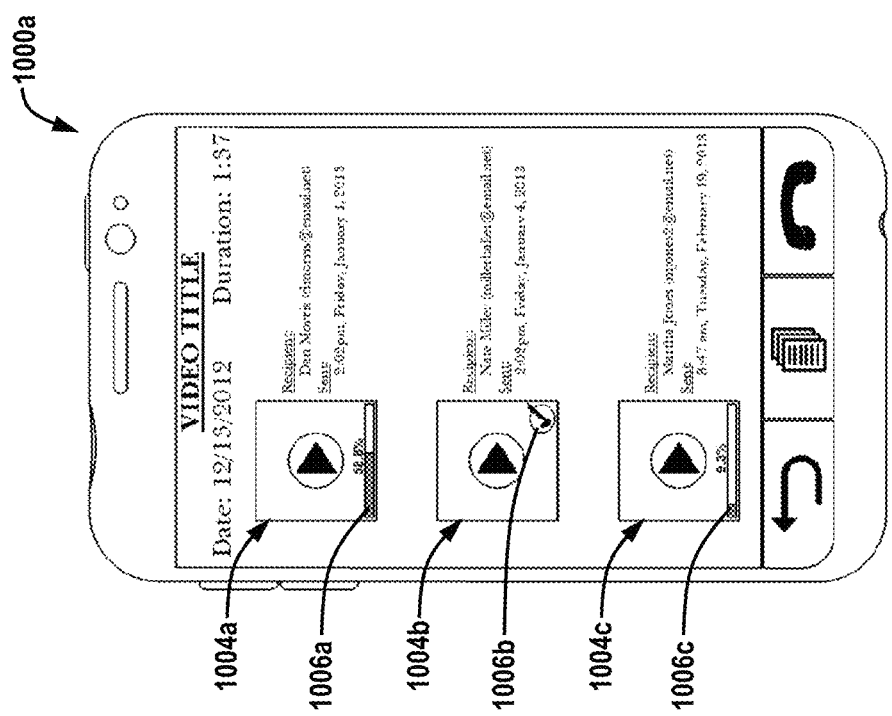
FIG. 10A illustrates an embodiment of an interface on a mobile device, the interface providing information about captured image data shared with others.

As with an email system, a provider may also be able to view which videos have been previously sent, and to whom they have been sent. FIG. 10A, for instance, illustrates a provider's computing device 1000a, as it displays an interface for a particular video. The interface may provide information about the video (e.g., when created, duration, who recorded it, title, etc.). In this embodiment, the interface may also provide information on to whom the video has been sent. For instance, this video is shown as having been sent to three recipients.

Consistent with aspects of some embodiments herein, a provider may be able to track whether a video has been played by a recipient, or the extent to which it has been played. The embodiment in FIG. 10A illustrates such an embodiment. For instance, information about a video sent to a first recipient is shown in section 1004a. In particular, the recipient may be identified along with the recipient's contact information (e.g., email address), and the date the video was sent. Moreover, an indicator 1006a may indicate whether or not the video has yet been accessed by the recipient and/or what portion has been accessed. In this particular embodiment, the indicator 1006a for the first recipient may include a status bar showing that the recipient played 58.8% of the video. Accordingly, where the duration of the video is 1:37, that provider may know that about 57 seconds have been played. In a similar manner, a third recipient section 1004c may also include an indicator 1006c with a status bar showing the third recipient played 9.3% of the video (about 9 seconds of the 97 second video). Had a recipient not played any of the video, a status bar may also appear showing that 0% was played.

In contrast, the second recipient section 1004b may not include a status bar. In this embodiment, the indicator 1006b for the second recipient section 1004b may instead include a checkmark or other icon. According to some embodiments, when the video has been fully played, the checkmark, icon, or other indicator may be used to graphically show that the full video has been played.

Tracking of how much of a video has been played may occur in any manner, including as discussed herein. In one embodiment, for instance, an email or other message may be received by the recipient indicating that a video has been shared with the recipient. The video may be attached to the email or other message and/or a link to the video may be provided. Where a link is provided, the link may have an address corresponding to a location where the video is accessible through a video hosting service provider. When the link is selected, a browser or application of the recipient's computing device may access the location and begin streaming the video. FIG. 10B, for instance, illustrates a computing device 1000b of a recipient which has begun to play a shared video (e.g., the video shared with the third recipient in FIG. 10A). As the video plays, a status bar 1008 may optionally indicate what portion of the video has been played.

If the recipient plays the entire video, the browser or application streaming the video may indicate that the full video was played. In response, a provider accessing a history of the video could see that the full video was played. If, however, the recipient plays only a portion of the video, that information can also be stored. In FIG. 10B, for instance, the recipient could stop playback of the video after nine seconds. In response, the provider using the computing device 1000*a* of FIG. 10A could see the third recipient only played 9.3% of the video.

According to at least some embodiments, tracking of the amount of the video or other media accessed by a recipient may occur in real-time. For instance, the application used by the provider in FIG. 10A may use an open socket technology that enables real-time updating from a service provider or server. The provider or server may continually update as the recipient streams the video as shown in FIG. 10B. Consequently, as the recipient continues to play the video in FIG. 10B, the open socket or connection with the provider in FIG. 10A may also update and show an increase in the amount of the video played.

Figure 11:
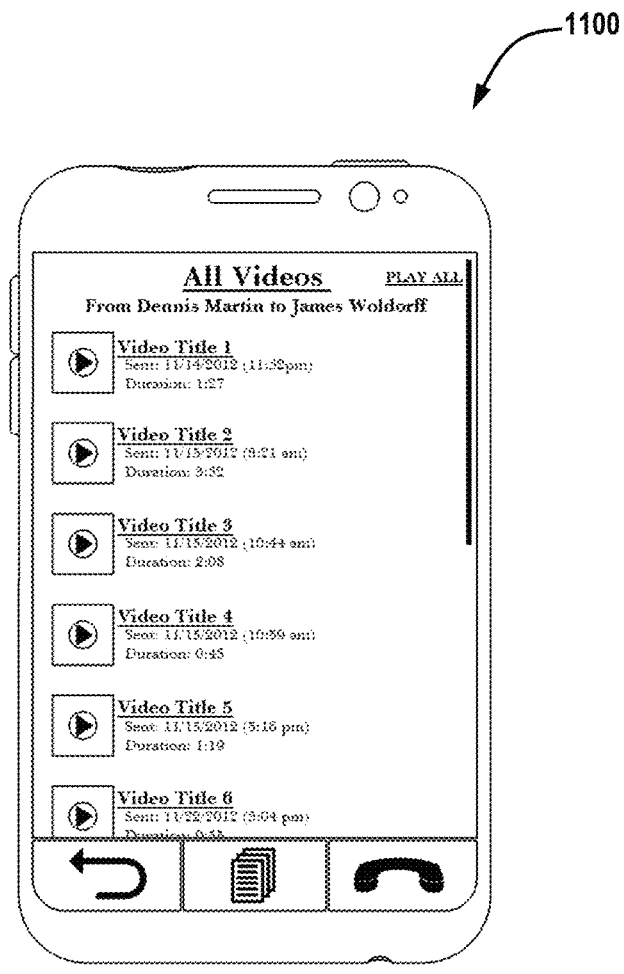
FIG. 11 illustrates an embodiment of an interface on a mobile device, the interface providing a history of shared image data.

Still other embodiments of the present disclosure may enable video information received by a recipient, or sent by a provider, to be filtered in any number of manners. For instance, videos may be filtered by date sent/received, duration, content, or the like. FIG. 11 illustrates an example manner in which a filter may be applied to show all videos sent from one person to another (e.g., from Dennis Martin to James Woldorff).

More particularly, an application, browser, or other component on a computing device 1100 may display all videos or other content sent from a provider to a recipient, along with potential information about each video (e.g., title, date/time sent, duration, whether previously played or not, etc.). The provider could then select each item individually to review what had been sent. In some embodiments, the videos can be arranged chronologically. In accordance with such an embodiment, the recipient may also have an option to automatically play all videos in succession. FIG. 11, for instance, includes a "Play All" option. If selected, the first video in the listed series may begin to play. When completed, the second video may automatically start, and such process may continue through the last video of the series.

The embodiment in FIG. 11 may generally illustrate a single aspect of the present disclosure, and other embodiments are contemplated. For instance, the interface in FIG. 11 may be provided to the sender or the recipient so that either may view or see all videos sent from one party to the other. In other embodiments, the list may also include videos sent back. Thus, a sequence of videos exchanged by each of the two parties may be displayed rather than videos sent from only one of the parties. In other embodiments, different filters may be applied (e.g., all videos received on a particular day regardless of sender) and then played in succession.

Embodiments of the present disclosure may generally be performed by a computing device, and more particularly performed in response to instructions provided by an application executing on the computing device or within a computing system. Hardware, firmware, software, or any combination of the foregoing may be used in directing the operation of a computing device or system. Embodiments of the present disclosure may thus comprise or utilize a special-purpose or general-purpose computer including computer hardware, such as, for example, one or more processors and system memory, as discussed in greater detail herein. Embodiments within the scope of the present disclosure also include physical and other computer-readable media for carrying or storing computer-executable instructions and/or data structures, including applications, tables, or other modules used to execute particular functions or direct selection or execution of other modules. Such computer-readable media can be any available media that can be accessed by a general-purpose or special-purpose computer system. Computer-readable media that store computer-executable instructions are physical storage media. Computer-readable media that carry computer-executable instructions are transmission media. Thus, by way of example, and not limitation, embodiments of the disclosure can comprise at least two distinctly different kinds of computer-readable media, including at least computer storage media and/or transmission media.

Examples of computer storage media include RAM, ROM, EEPROM, CD-ROM or other optical disk storage, magnetic disk storage or other magnetic storage devices, or any other non-transmission medium which can be used to store desired program code means in the form of computer-executable instructions or data structures and which can be accessed by a general-purpose or special-purpose computer.

A "communication network" may generally be defined as one or more data links that enable the transport of electronic data between computer systems and/or modules, engines, and/or other electronic devices. When information is transferred or provided over a communication network or another communications connection (either hardwired, wireless, or a combination of hardwired or wireless) to a computing device, the computing device properly views the connection as a transmission medium. Transmission media can include a communication network and/or data links, carrier waves, wireless signals, and the like, which can be used to carry desired program or template code means or instructions in the form of computer-executable instructions or data structures and which can be accessed by a general-purpose or special-purpose computer. Combinations of physical storage media and transmission media should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above, nor performance of the described acts or steps by the components described above. Rather, the described features and acts are disclosed as example forms of implementing the claims.

Those skilled in the art will appreciate that the embodiments may be practiced in network computing environments with many types of computer system configurations, including, personal computers, desktop computers, laptop computers, message processors, hand-held devices, programmable logic machines, multi-processor systems, microprocessor-based or programmable consumer electronics, network PCs, tablet computing devices, minicomputers, mainframe computers, mobile telephones, PDAs, servers, and the like.

Embodiments may also be practiced in distributed system environments where local and remote computer systems, which are linked (either by hardwired data links, wireless data links, or by a combination of hardwired and wireless data links) through a network, both perform tasks. In a distributed computing environment, program modules may be located in both local and remote memory storage devices.

Although the foregoing description contains many specifics, these should not be construed as limiting the scope of the invention or of any of the appended claims, but merely as providing information pertinent to some specific embodiments that may fall within the scopes of the invention and the appended claims. Various embodiments are described, some of which incorporate differing features. The features illustrated or described relative to one embodiment are interchangeable and/or may be employed in combination with features of any other embodiment herein. In addition, other embodiments of the invention may also be devised which lie within the scopes of the invention and the appended claims. The scope of the invention is, therefore, indicated and limited only by the appended claims and their legal equivalents. All additions, deletions and modifications to the invention, as disclosed herein, that fall within the meaning and scopes of the claims are to be embraced by the claims.

What is claimed is:

1. A system for sharing video content and reporting on whether the video content has been played, comprising:
    one or more processors;
    a network interface in communication with the one or more processors; and
    computer-readable storage media having stored thereon computer-executable instructions that, when executed by the one or more processors, cause the system to:
        access video content identified by a provider entity for sharing with a recipient entity;
        provide the video content to the recipient entity;
        monitor an amount of the video content played by the recipient entity; and
        provide to the provider entity with reporting information indicating whether the video content was played by the recipient entity.

2. The system of claim 1, wherein the computer-executable instructions, when executed by the one or more processors, further cause the system to:
    notify the recipient entity of the availability of the video content.

3. The system of claim 2, wherein the computer-executable instructions, when executed by the one or more processors, further cause the system to:
    send an email to the recipient entity to notify the recipient entity of the availability of the video content.

4. The system of claim 2, wherein the computer-executable instructions, when executed by the one or more processors, further cause the system to:
    provide the recipient entity with a link to the video content.

5. The system of claim 1, wherein the computer-executable instructions, when executed by the one or more processors, further cause the system to:
    monitor an amount of the video content played by the recipient entity by tracking live streaming of the video content.

6. The system of claim 1, wherein the computer-executable instructions, when executed by the one or more processors, further cause the system to:
    provide to the provider entity reporting information indicating whether the video content was played by the recipient entity in about real-time with playback of the video content by the recipient entity.

7. The system of claim 1, wherein the computer-executable instructions, when executed by the one or more processors, further cause the system to:
    provide the video content to the recipient entity by way of a mobile computing device under control of the recipient entity.

8. The system of claim 1, wherein the computer-executable instructions, when executed by the one or more processors, further cause the system to:
    provide a video hosting service through which the video content is provided from the provider entity to the recipient entity.

9. The system of claim 8, wherein the video hosting service provides a web interface including one or more of a provider view or a recipient view.

10. The system of claim 8, wherein the video hosting service provides a mobile application interface including one or more of a provider view or a recipient view.

11. The system of claim 1, wherein the reporting information includes a view for viewing an extent to which multiple recipient entities have viewed the same video content.

12. The system of claim 1, wherein the reporting information indicates whether:
    the recipient entity has fully played the video content;
    the recipient entity has not played the video content; or
    the recipient entity has partially played the video content.

13. The system of claim 1, wherein the reporting information indicates the recipient entity has partially played the video content by reporting a percentage played.

14. The system of claim 1, wherein the computer-executable instructions, when executed by the one or more processors, further cause the system to:
    filter a set of videos to display a subset of video content items.

15. The system of claim 14, wherein the computer-executable instructions, when executed by the one or more processors, further cause the system to:
    automatically play all of the videos of the subset of video content items in sequence.

16. The system of claim 1, wherein the computer-executable instructions, when executed by the one or more processors, further cause the system to:
    provide the video content to the recipient entity; and
    while providing the video content to the recipient entity, continually update an amount of video content provided to the recipient entity for real-time tracking or reporting.

17. A computer-implemented method for sharing video content, comprising:
    receiving, from a provider entity, information on a recipient entity with whom video content is shared or will be shared;
    providing the video content to the recipient entity;
    tracking an extent to which the video content is played by the recipient entity; and
    providing to the provider entity reporting information corresponding to the extent to which video content has been played by the recipient entity.

* * * * *